(12) United States Patent
Park

(10) Patent No.: US 8,174,566 B2
(45) Date of Patent: May 8, 2012

(54) STEREOSCOPIC IMAGE DISPLAY APPARATUS OF NET PATTERN

(75) Inventor: In-Kyu Park, Seoul (KR)

(73) Assignee: 3DIS Co., Ltd. (KR)

( * ) Notice: Subject to any disclaimer, the term of this patent is extended or adjusted under 35 U.S.C. 154(b) by 928 days.

(21) Appl. No.: 12/161,820

(22) PCT Filed: Jan. 23, 2007

(86) PCT No.: PCT/KR2007/000401
§ 371 (c)(1),
(2), (4) Date: Jul. 23, 2008

(87) PCT Pub. No.: WO2007/083983
PCT Pub. Date: Jul. 26, 2007

(65) Prior Publication Data
US 2010/0220177 A1     Sep. 2, 2010

(30) Foreign Application Priority Data
Jan. 23, 2006  (KR) .................. 10-2006-0007032

(51) Int. Cl.
*H04N 7/18* (2006.01)
*G06F 15/16* (2006.01)

(52) U.S. Cl. ......................................... 348/54; 348/42

(58) Field of Classification Search ............ 348/42, 348/54
See application file for complete search history.

(56) References Cited

U.S. PATENT DOCUMENTS

| 5,900,972 | A  * | 5/1999 | Chikazawa  | 359/464 |
| 2004/0150583 | A1 * | 8/2004 | Fukushima et al. | 345/6 |
| 2004/0165263 | A1 * | 8/2004 | Sudo et al. | 359/462 |
| 2004/0169919 | A1 * | 9/2004 | Uehara et al. | 359/443 |
| 2005/0117216 | A1 * | 6/2005 | Lee | 359/464 |
| 2005/0185275 | A1 | 8/2005 | Jang et al. | |
| 2005/0225502 | A1 * | 10/2005 | Nam et al. | 345/55 |
| 2006/0012593 | A1 * | 1/2006 | Iriguchi et al. | 345/204 |
| 2007/0086090 | A1 * | 4/2007 | Wang et al. | 359/464 |
| 2007/0152997 | A1 * | 7/2007 | Lee | 345/419 |
| 2009/0102753 | A1 * | 4/2009 | Yamashita et al. | 345/55 |

FOREIGN PATENT DOCUMENTS

| EP | 0625861 | 11/1994 |
| KR | 1020060004818 | 1/2006 |
| KR | 1020060032547 | 4/2006 |

* cited by examiner

Primary Examiner — Zarni Maung
(74) Attorney, Agent, or Firm — Park & Associates IP Law, P.C.

(57) ABSTRACT

A stereoscopic image display apparatus is provided which includes an image display panel and a parallax barrier having parallax barrier pieces in the front of the image display panel. In the stereoscopic image display apparatus, the image display panel has a pixel pattern in which left-eye sub pixels and right-eye sub pixels are alternately arranged in horizontal and vertical directions. The parallax barrier is spaced apart from the image display panel by a predetermined distance and the parallax barrier pieces with a predetermined size are arranged at a predetermined interval in the horizontal and vertical directions so as to allow a left eye and a right eye to separately recognize a left-eye image and a right-eye image formed by the left-eye sub pixels and the right-eye sub pixels, respectively. Accordingly, since a strip pattern is removed from s stereoscopic image, it is possible to obtain a natural stereoscopic image. In addition, since a strip pattern and a color mixing phenomenon are removed from s stereoscopic image, it is possible to obtain a natural and clear stereoscopic image.

13 Claims, 32 Drawing Sheets

FIG. 3

Prior Art

FIG. 6

Prior Art

STEREOSCOPIC IMAGE DISPLAY APPARATUS OF NET PATTERN

TECHNICAL FIELD

The present invention relates to a stereoscopic image display apparatus, and more particularly, to a stereoscopic image display apparatus employing a net-patterned parallax barrier with a checkered net structure.

BACKGROUND ART

In a history of stereoscopic image display, Charles Wheatstone published a first stereoscopic image technology in England in 1836. Thereafter, with development of a photograph technology, a stereoscopic image processing technology employing a parallax barrier and a lenticular lens was developed in the early 20th century, thereby opening a new age of a stereoscopic image. In the middle 20th century, a holographic image processing technology was introduced to suggest anew principle of a stereoscopic image. Recently, a spectacle type stereoscopic image processing technique using a chromatic aberration or a polarizing filter, a synchronous shutter technique of providing time-divisional images, a technique using a head mount set, and the like were suggested.

The stereoscopic image processing technique using a hologram is hardly put into practice for processing digitalized image information. Examples of a stereoscopic image processing technique using spectacles include an anaglyph technique using color spectacles, a polarizing spectacle technique, and a synchronous shutter spectacle technique. These techniques are not widely used for the reason of inconvenience due to the wearing of special spectacles, a sanitary problem, a bad influence on a human body, and the like.

Recently, techniques not using spectacles were actively studied. A representative technique not using spectacles is a lenticular technique and a parallax barrier technique. In the lenticular technique, a lenticular lens plate in which cylindrical lenses are vertically arranged is disposed in the front of an image display panel. In the parallax barrier technique, a parallax barrier in which a kind of strip pattern is formed is disposed in the front of an image display panel.

Recently, with wide spread of a thin film transistor (TFT) liquid crystal display (LCD), stereoscopic image display apparatus embodied by coupling a parallax barrier to the TFT LCD were suggested.

The main reason for not putting the stereoscopic image display apparatus using a parallax barrier is that a visible distance is too large to be applicable to a screen of a computer monitor or a mobile phone. Many studies for solving the problem have been made, but a good performance was not obtained in the art.

The inventor of the present invention suggested a 2D/3D convertible stereoscopic image display apparatus which can markedly reduce the visible distance and which can be put into practice at low cost, which is disclosed in PCT/KR03/01415 and PCT/KR03/01537. The 2D/3D convertible stereoscopic image display apparatus described in these applications are omitted.

On the other hand, it should be noted that a stereoscopic image display apparatus in the following description means a 2D/3D convertible stereoscopic image display apparatus and the stereoscopic image display apparatus can be embodied as the 2D/3D convertible stereoscopic image display apparatus.

The stereoscopic image display apparatus according to the prior applications has a problem.

The problem of the prior application is described with reference to FIGS. 1 to 3.

Referring to FIG. 1, in the known 2D image display panel which is generally used in a computer monitor, RGB pixels (sub pixels) form a unit pixel, the unit pixels are arranged in a matrix pattern, and an image (2D image) is displayed by actively driving the unit pixels. The concepts of the 2D image and the 3D image (stereoscopic image) should be clearly understood for the purpose of understanding the invention. The 2D image means that a left eye and a right eye recognize the same image. In other words, even an image exhibiting a stereoscopic effect in software by the use of a perspective feeling or the like is not the 3D image nut the 2D image, because the left eye and the right eye recognize the same image. The stereoscopic image means an image obtained by allowing the left eye and the right eye to recognize a left-eye image and a right-eye image which are different from each other by a difference in viewing angle.

FIG. 2 is a diagram illustrating a known linear parallax barrier. FIG. 3 is a diagram illustrating a known 2D/3D convertible image display panel (hereinafter, briefly referred to as "image display panel"). It will be understood by those skilled in the art that scales are different from actual ones in FIGS. 2 and 3 for the purpose of easily understanding the invention. The parallax barrier shown in FIG. 2 is spaced apart from the image display panel by a certain distance. The same is true of all the subsequent drawings. In the image display panel shown in FIG. 3, the RGB pixels are classified into the left-eye pixels and the right-eye pixels. As shown in FIG. 6, the RGB pixels may be set as a unit pixel and the unit pixels may be classified into the left-eye pixels and the right-eye pixels. The technique of providing a stereoscopic image by classifying the RGB pixels into the left-eye pixels and the right-eye pixels is disclosed in PCT/KR03/01537 and the like and several problems to be solved for embodying the technique are also described in detail in the above-mentioned application. That is, an image focused through the parallax barrier is divided into the left-eye image and the right-eye image to embody a stereoscopic image. This stereoscopic image embodying method is similarly used in the following description. The technique of providing a stereoscopic image by using RGB pixels as a unit pixel and classifying the unit pixels into the left-eye pixels and the right-eye pixels is disclosed in PCT/KR03/01415.

In order to obtain a stereoscopic image, the linear parallax barrier shown in FIG. 2 is disposed in the front of the image display panel shown in FIG. 3 so as to be apart by a certain distance from each other. Specifically, the left-eye pixels and the right-eye pixels of the image display panel are disposed in a linear pattern and the linear patterns are alternately arranged. The parallax barrier for distinguishing the left-eye image and the right-eye image is configured accordingly in a strip pattern. FIG. 4 is a diagram illustrating a left-eye image formed by the linear parallax barrier shown in FIG. 2 and the image display panel shown in FIG. 3. FIG. 5 is a diagram illustrating a right-eye image formed by the linear parallax barrier shown, in FIG. 2 and the image display panel shown in FIG. 3.

As shown in FIGS. 4 and 5, since strip patterns are formed in the left-eye image and the right-eye image, the strip patterns are also formed in the stereoscopic image recognized by a person. Although the strip patterns are exaggerated in FIGS. 4 and 5, but a person having a normal sight can recognize the strip patterns and thus feels uneasy.

Figure 6:
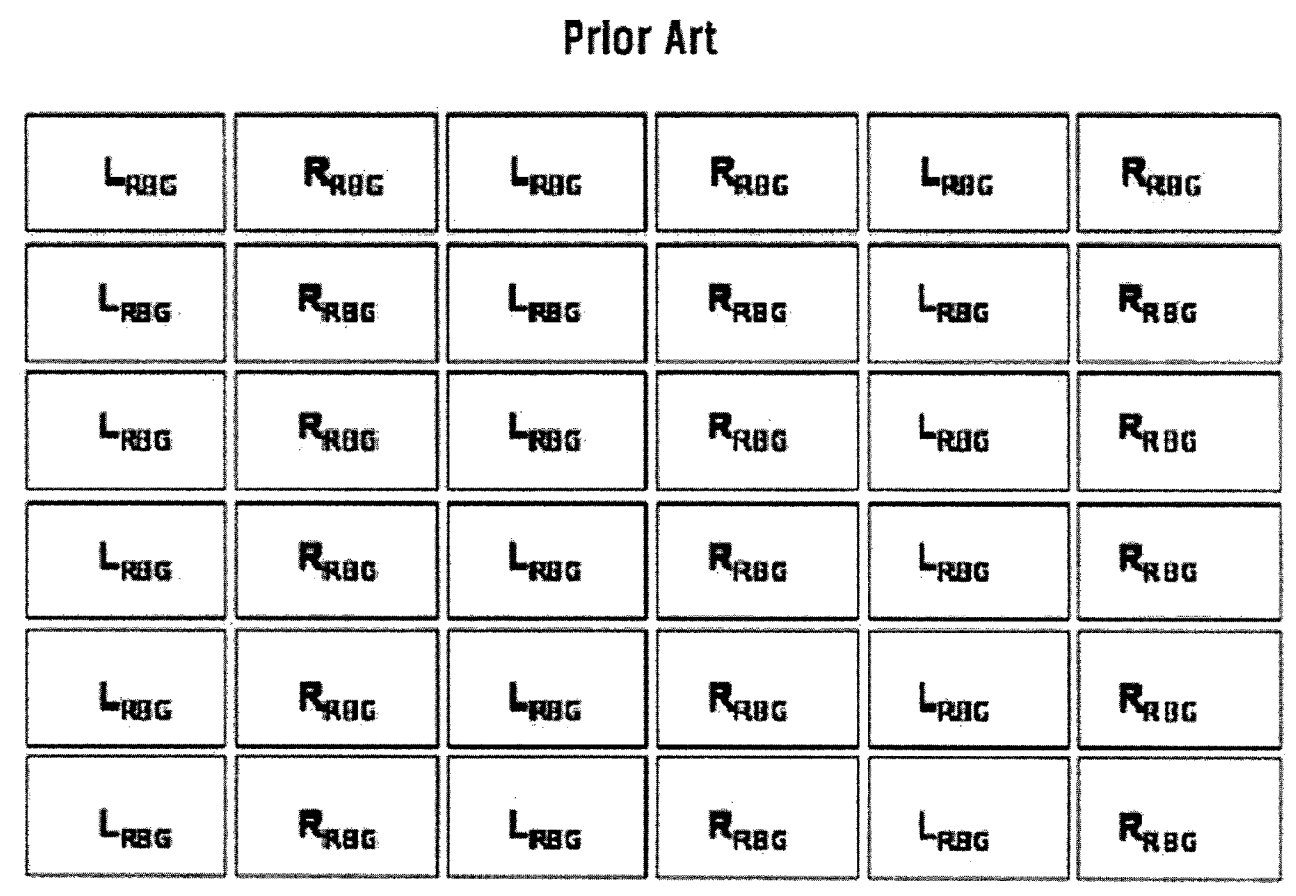

FIG. 6 is a diagram illustrating another known image display panel. FIG. 7 is a diagram illustrating a left-eye image formed by the linear parallax barrier shown in FIG. 2 and the image display panel shown in FIG. 6. FIG. 8 is a diagram illustrating a right-eye image formed by the linear parallax barrier shown in FIG. 2 and the image display panel shown in FIG. 6. This example indicates the technique of providing a stereoscopic image by using RGB pixels as a unit pixel and classifying the unit pixels into the left-eye pixels and the right-eye pixels as described above.

Similarly to FIGS. 4 and 5, since strip patterns are formed in the left-eye image and the right-eye image, the strip patterns are also formed in the stereoscopic image recognized by a person. A person having a normal sight can recognize the strip patterns and thus feels uneasy. In this case, a stereoscopic image can be obtained. However, since the RGB pixels which are sub pixels are used as a unit pixel, there is a problem in that a color mixing phenomenon occurs and thus a color tone is less clear than that of the stereoscopic image shown in FIGS. 4 and 5 and embodied at a sub pixel level.

The strip patterns formed in the image displayed by the known stereoscopic image display apparatus are inevitably formed due the strip patterns of the parallax barrier.

It is widely known in the art that the left-eye pixels and the right-eye pixels of the image display panel are configured in a linear pattern and arranged alternately to configure the parallax barrier for distinguishing the left-eye image and the right-eye image in the strip patterns.

The inventor of the present invention intends to solve the above-mentioned problems by providing an image display panel and a parallax barrier, in which left-eye pixels and right-eye pixels of the image display panel are not configured in a linear pattern and the parallax barrier is not configured in a strip pattern.

DISCLOSURE OF THE INVENTION

Technical Goal

In order to solve the above-mentioned problems, an object of the invention is to remove a strip pattern from the stereoscopic image.

Another object of the invention is to remove a strip pattern and a color mixing phenomenon.

Technical Solution

In order to achieve the above-mentioned object, according to a first aspect of the invention, there is provided a stereoscopic image display apparatus including an image display panel; and a parallax barrier having parallax barrier pieces disposed in the front of the image display panel.

According to a second aspect of the invention, there is provided a stereoscopic image display apparatus including an image display panel and a parallax barrier having parallax barrier pieces disposed in the front of the image display panel, wherein the image display panel has a pixel pattern in which left-eye sub pixels and right-eye sub pixels are alternately arranged in horizontal and vertical directions, and wherein the parallax barrier is spaced apart from the image display panel by a predetermined distance and the parallax barrier pieces with a predetermined size are arranged at a predetermined interval in the horizontal and vertical directions so as to allow a left eye and a right eye to separately recognize a left-eye image and a right-eye image formed by the left-eye sub pixels and the right-eye sub pixels, respectively.

According to a third aspect of the invention, there is provided a stereoscopic image display apparatus including an image display panel and a parallax barrier having parallax barrier pieces disposed in the front of the image display panel, wherein the image display panel has a pixel pattern in which left-eye pixels and right-eye pixels are alternately arranged in horizontal and vertical directions, and wherein the parallax barrier is spaced apart from the image display panel by a predetermined distance and the parallax barrier pieces with a predetermined size are arranged at a predetermined interval in the horizontal and vertical directions so as to allow a left eye and a right eye to separately recognize a left-eye image and a right-eye image formed by the left-eye pixels and the right-eye pixels, respectively.

The parallax barrier may have a repeated pattern in which a first piece in a first vertical line of the parallax barrier pieces is interconnected to a second piece which is a piece in a second vertical line adjacent to the right side of the first vertical line and which is adjacent to the right-lower side of the first piece, and the second piece is interconnected to a third piece which is a piece in the first vertical line and which is adjacent to the left-lower side of the second piece.

The parallax barrier may have a repeated pattern in which a first piece in a first vertical line of the parallax barrier pieces is interconnected to a second piece which is a piece in a second vertical line adjacent to the right side of the first vertical line and which is adjacent to the right-lower side of the first piece and the second piece is interconnected to a third piece which is a piece in a third vertical line adjacent to the right side of the second vertical line and which is adjacent to the right-lower side of the second piece.

The parallax barrier may have a repeated pattern in which a first piece in a first horizontal line of the parallax barrier pieces is interconnected to a second piece which is a piece in a second horizontal line adjacent to the lower side of the first horizontal line and which is adjacent to the right-lower side of the first piece and the second piece is interconnected to a third piece which is a piece in the first horizontal line and which is adjacent to the right-upper side of the second piece.

The parallax barrier may have a repeated pattern in which the parallax barrier pieces are interconnected in a predetermined combination.

All the parallax barrier pieces of the parallax barrier may be interconnected.

According to a fourth aspect of the invention, there is provided a stereoscopic image display apparatus comprising an image display panel and a parallax barrier which has parallax barrier pieces in the front of the image display panel, wherein the image display panel has a pixel pattern in which left-eye sub pixels and right-eye sub pixels are alternately arranged at an interval of a predetermined first number of pixels in a horizontal direction, and wherein the parallax barrier is spaced apart from the image display panel by a predetermined distance and the parallax barrier pieces with a predetermined size are arranged at predetermined first and second intervals corresponding to the first and second numbers of pixels in the horizontal and vertical directions, respectively, so as to allow a left eye and a right eye to separately recognize a left-eye image and a right-eye image formed by the left-eye sub pixels and the right-eye sub pixels, respectively.

The first and second numbers of pixels may be 1 and 2 (or 3), respectively.

The first and second numbers of pixels may be 2 (or 3) and 1, respectively.

The parallax barrier may have a repeated pattern in which the parallax barrier pieces are interconnected in a predetermined combination.

All the parallax barrier pieces of the parallax barrier may be interconnected.

The pixels or sub pixels of the image display panel may form unit pixels with any one pattern of a strip pattern, a mosaic pattern, and a delta pattern, which means the formation of the following unit pixels.

As shown in FIG. 10, the strip pattern has a basic pixel pattern in which the pixels or sub pixels are arranged in the order of R, G, B, R, G, B, . . . , R, G, and B, wherein the respective first lines of the left-eye sub pixels and the right-eye sub pixels have an arrangement of $R_L$, $G_R$, $B_L$, $R_R$, . . . , $R_R$, and $G_L$, the respective second lines have an arrangement of $R_R$, $G_L$, $B_R$, $R_L$, . . . , $R_L$, and $G_R$, and the respective third, fourth, . . . , and n-th lines have arrangements in which the left-eye sub pixels and the right-eye pixels are alternately started, respectively. The left-eye sub pixels and the right-eye sub pixels can form an inclined strip arrangement as a whole.

As shown in FIG. 26, the mosaic pattern has a basic pixel pattern in which the pixels or sub pixels are arranged in the order of R, G, B, R, G, B, . . . , R, G, and B, wherein the respective first lines of the left-eye sub pixels and the right-eye sub pixels have an arrangement of $R_L$, $G_L$, $B_L$, $R_R$, $G_R$, $B_R$, . . . , $R_R$, $G_R$, and $B_R$, the respective second lines have an arrangement of $R_R$, $G_R$, $B_R$, $R_L$, $G_L$, $B_L$, . . . , $R_L$, $G_L$, and $B_L$, and the respective third, fourth, . . . , and n-th lines have arrangements in which the left-eye sub pixels and the right-eye sub pixels are alternately started, respectively. The left-eye sub pixels and the right-eye sub pixels can form a mosaic arrangement as a whole.

As shown in FIG. 30, the strip pattern has a basic pixel pattern in which the pixels or sub pixels are arranged in the order of R, G, B, R, G, B, . . . , R, G, and B, wherein the respective first lines of the left-eye sub pixels and the right-eye sub pixels have an arrangement of $R_L$, $G_R$, $B_L$, $R_R$, . . . , $R_R$, and $G_L$, the respective second lines have an arrangement of $R_R$, $G_L$, $B_R$, $R_L$, . . . , $R_R$, and $G_L$, the respective third lines have an arrangement of $R_R$, $G_L$, $B_R$, $R_L$, . . . , $R_L$, and $G_R$, and the fourth lines have the same arrangement as the first lines. In this way, the first, second, and third lines are alternately repeated. The left-eye sub pixels and the right-eye sub pixels can form a delta arrangement of a triangle shape as a whole, like the second and third lines.

The parallax barrier may be one liquid crystal display panel of TN, STN, FSTN, HTN, and CSTN liquid crystal panels or be a film type.

BRIEF DESCRIPTION OF THE DRAWINGS

FIG. 3 is a diagram illustrating a known image display panel.

FIG. 6 is a diagram illustrating another known image display panel.

FIG. 26 is a diagram illustrating an image display panel according to the second embodiment of the invention.

FIG. 30 is a diagram illustrating an image display panel according to the third embodiment of the invention.

DESCRIPTION OF THE EXEMPLARY EMBODIMENTS

In order to clearly understand the present invention, operational advantages of the invention, and objects achieved by embodiments of the invention, the accompanying drawings and descriptions exemplifying the exemplary embodiments of the invention should be referred to.

A stereoscopic image display apparatus according to an embodiment of the invention includes an image display panel and a parallax barrier having parallax barrier pieces disposed in the front of the image display panel.

Figure 1:
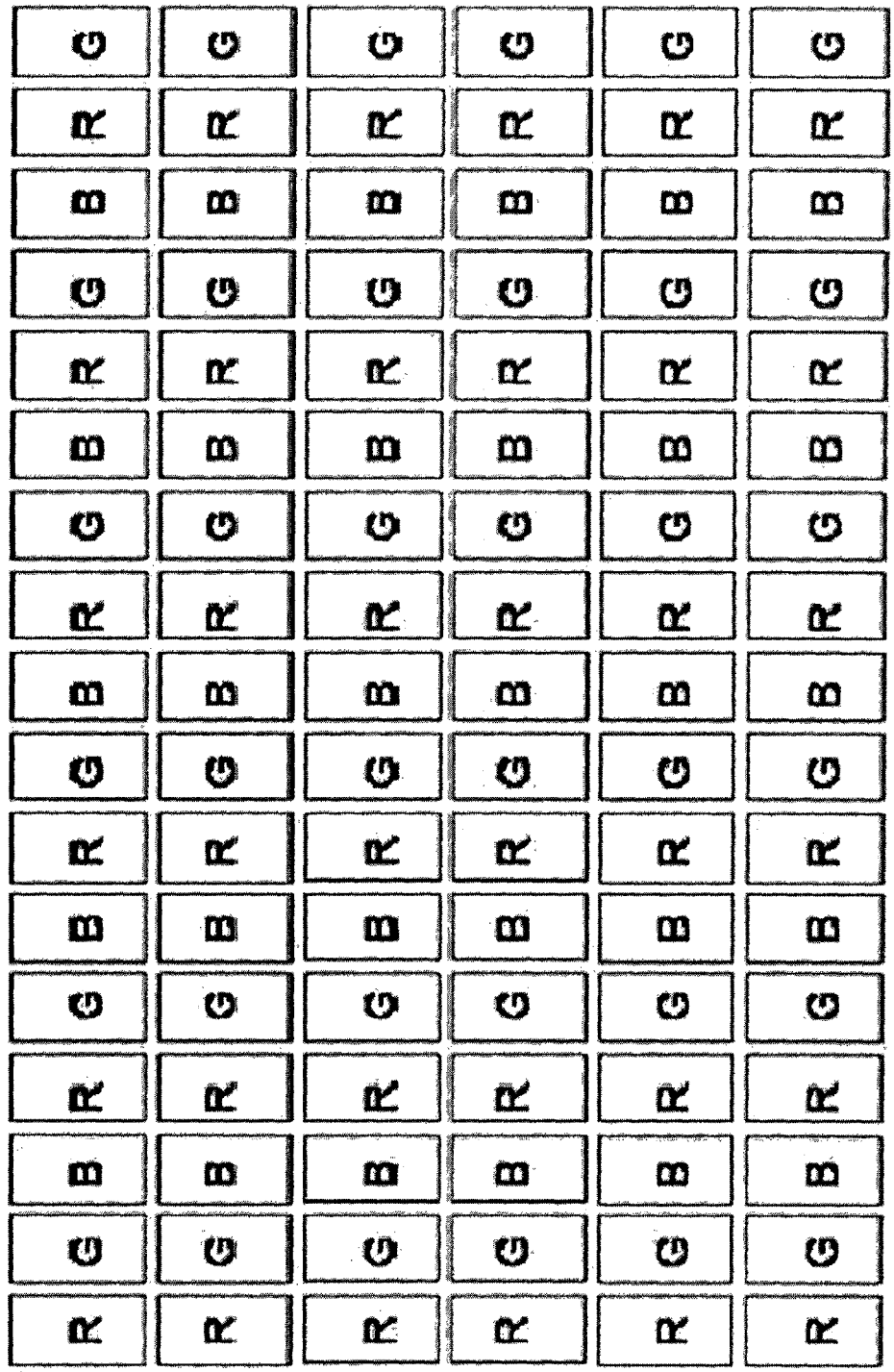
FIG. 1 is a diagram illustrating a known 2D image display panel.
Figure 2:
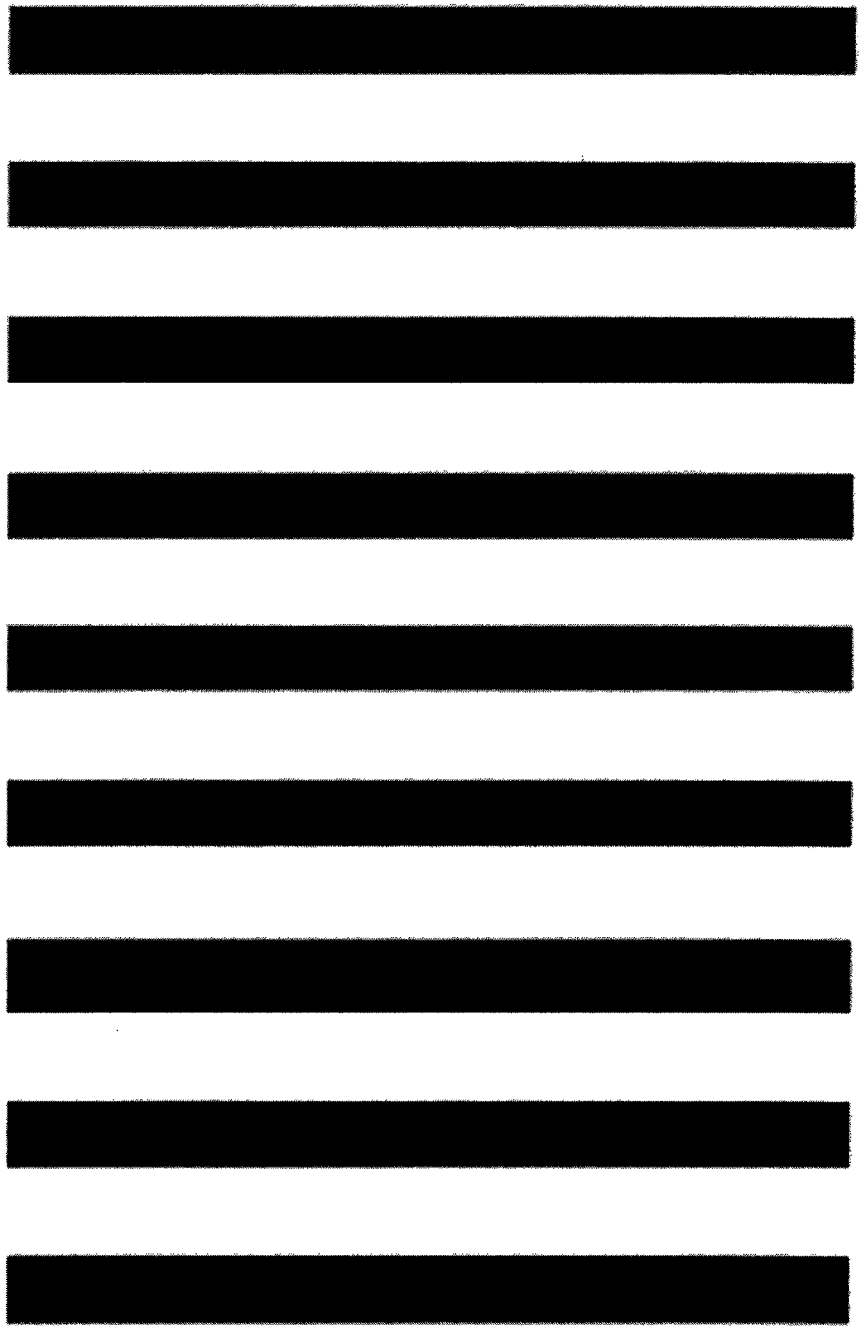
FIG. 2 is a diagram illustrating a known linear parallax barrier.
Figure 4:
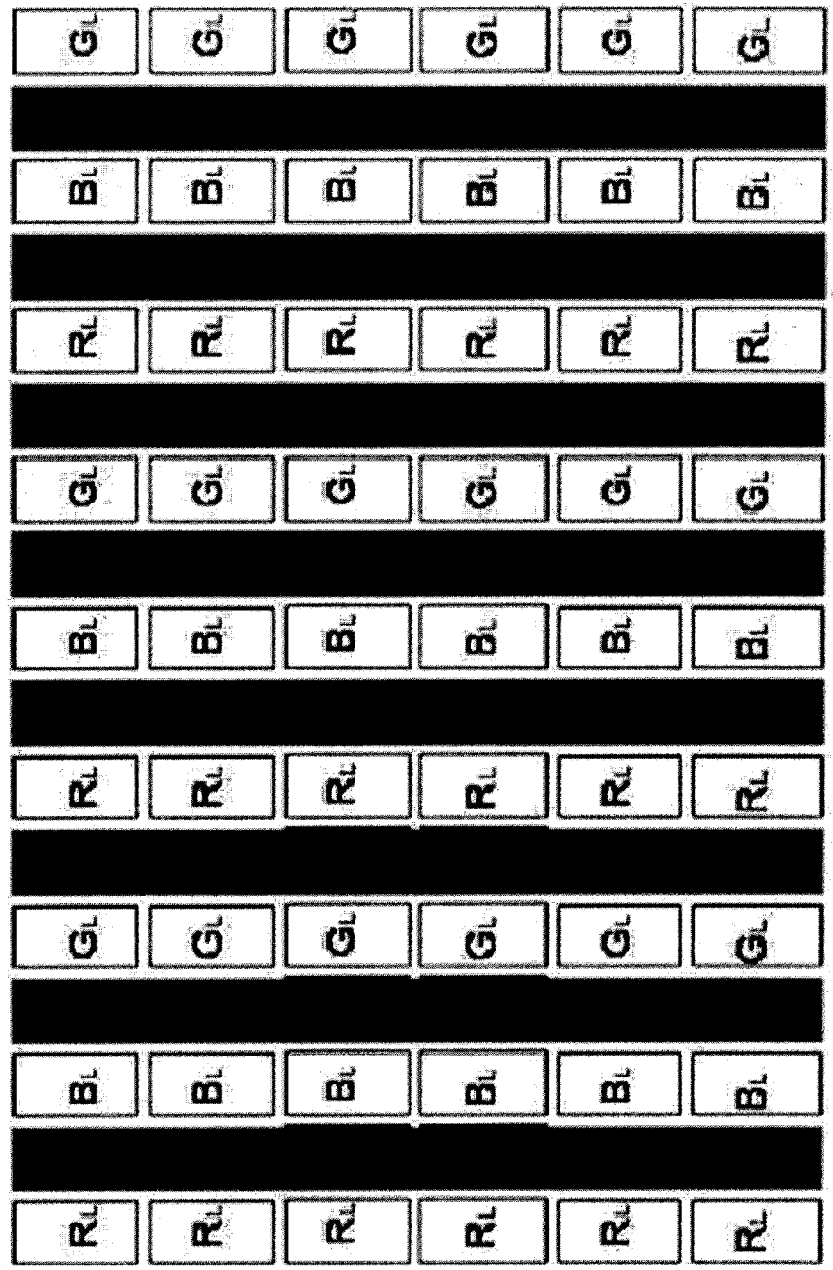
FIG. 4 is a diagram illustrating a left-eye image formed by the linear parallax barrier shown in FIG. 2 and the image display panel shown in FIG. 3.
Figure 5:
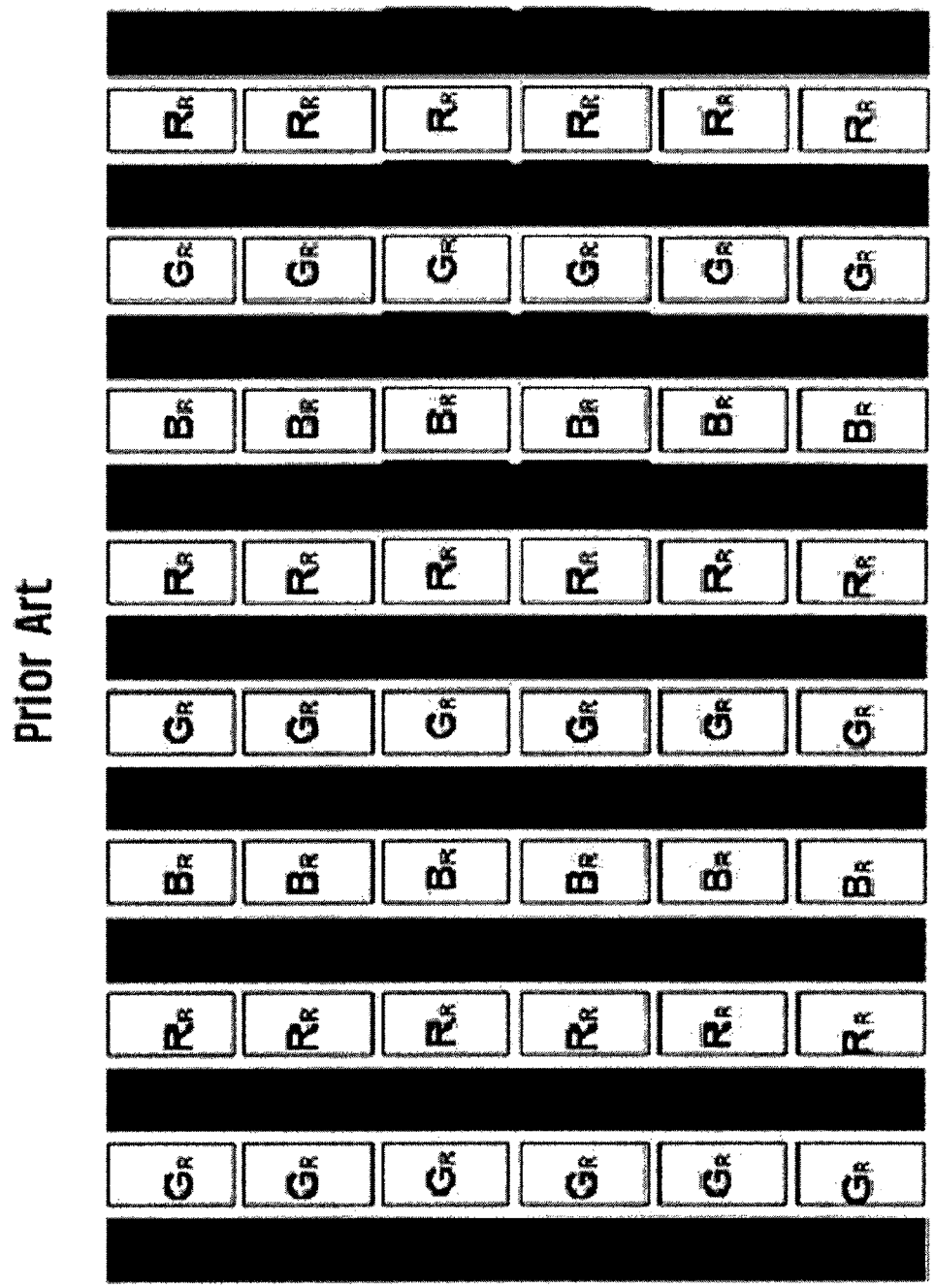
FIG. 5 is a diagram illustrating a right-eye image formed by the linear parallax barrier shown in FIG. 2 and the image display panel shown in FIG. 3.
Figure 7:
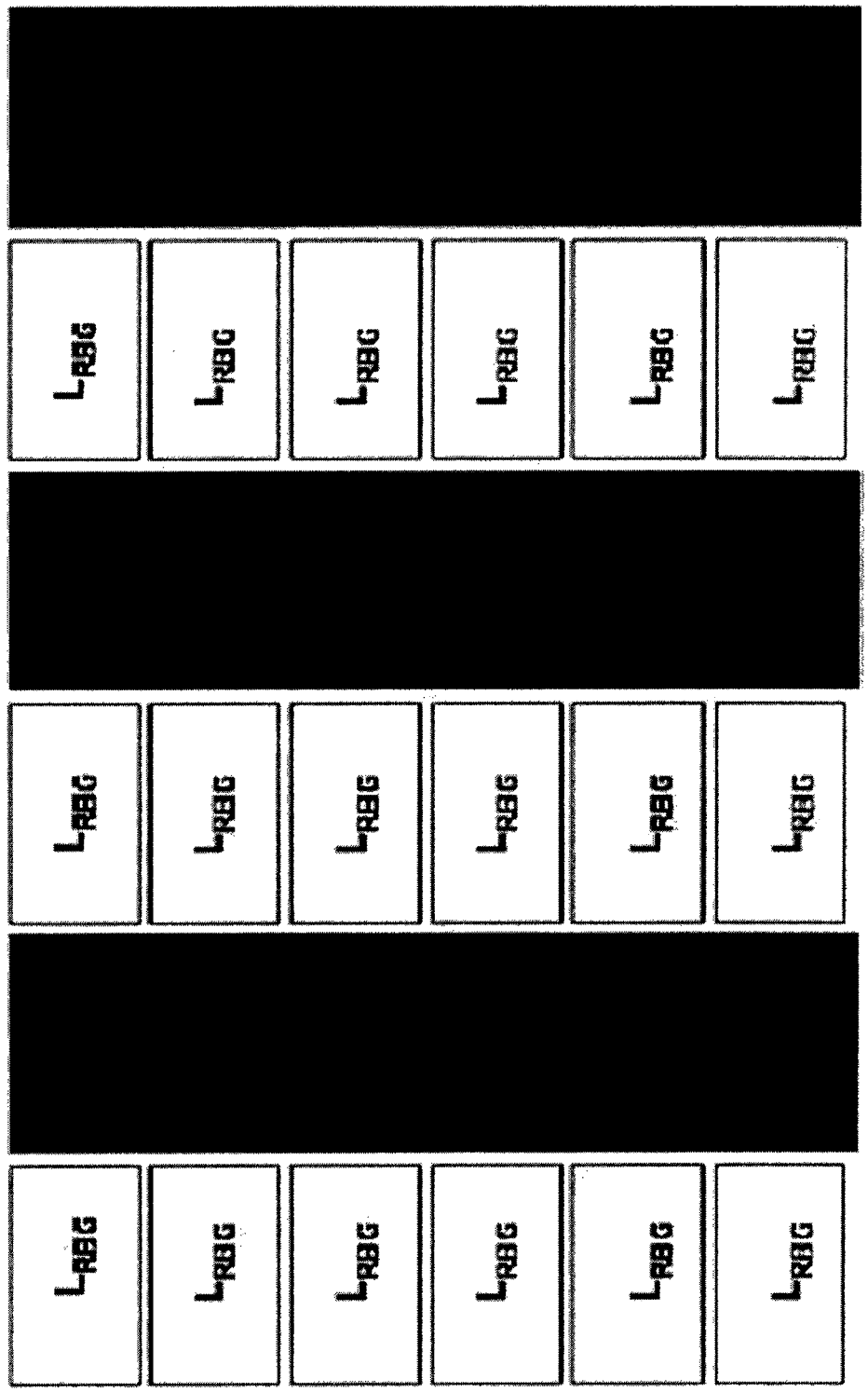
FIG. 7 is a diagram illustrating a left-eye image formed by the linear parallax barrier shown in FIG. 2 and the image display panel shown in FIG. 6.
Figure 8:
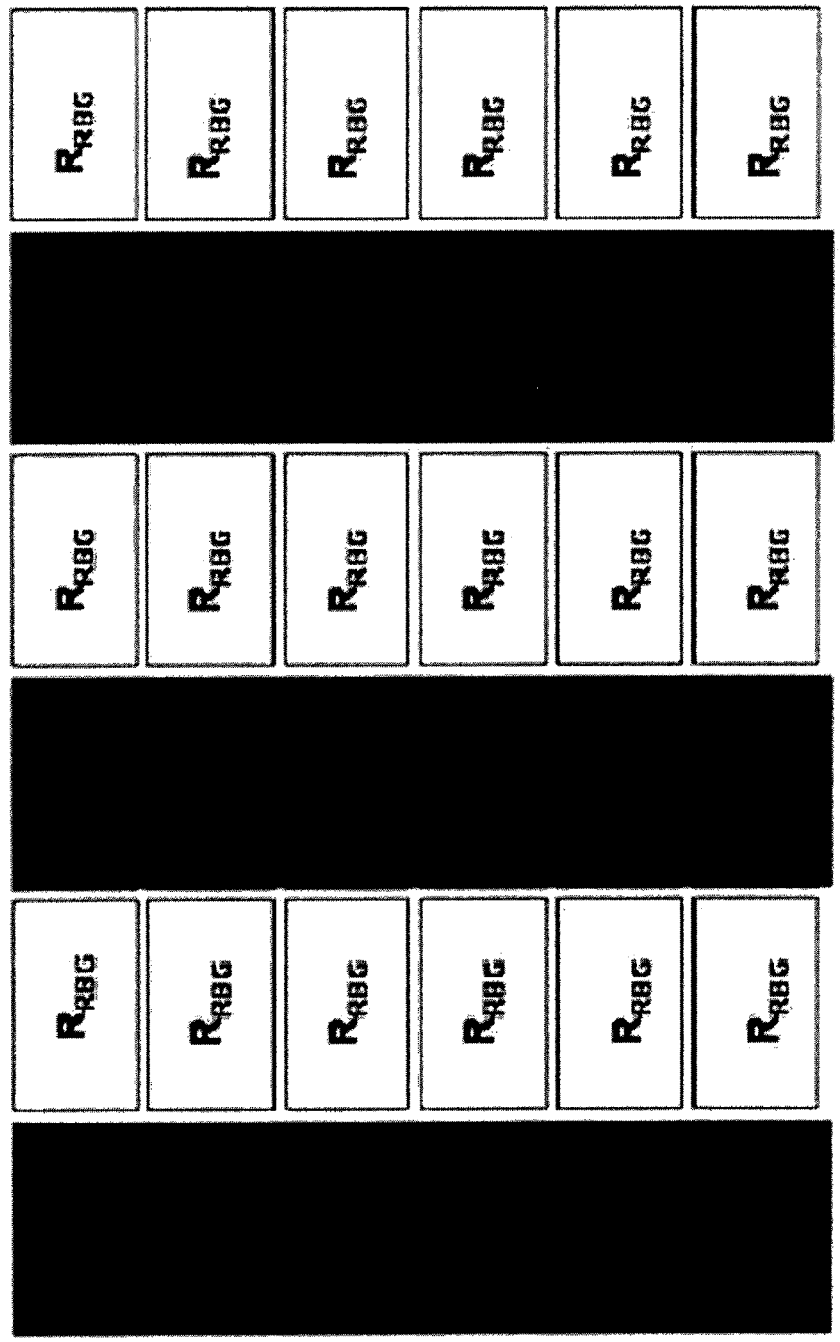
FIG. 8 is a diagram illustrating a right-eye image formed by the linear parallax barrier shown in FIG. 2 and the image display panel shown in FIG. 6.
Figure 9:
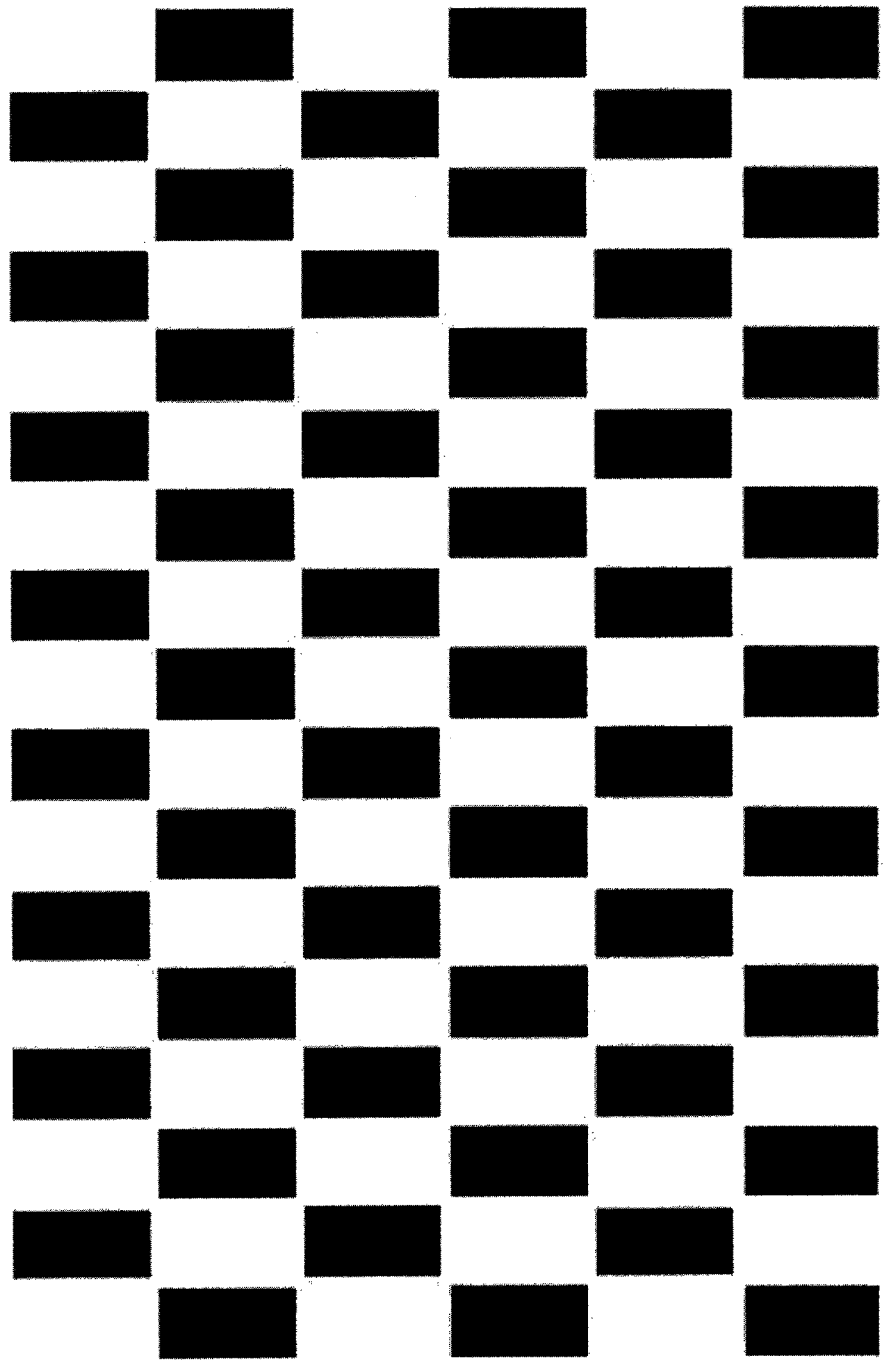
FIG. 9 is a diagram illustrating a parallax barrier according to a first embodiment of the invention.
Figure 25:
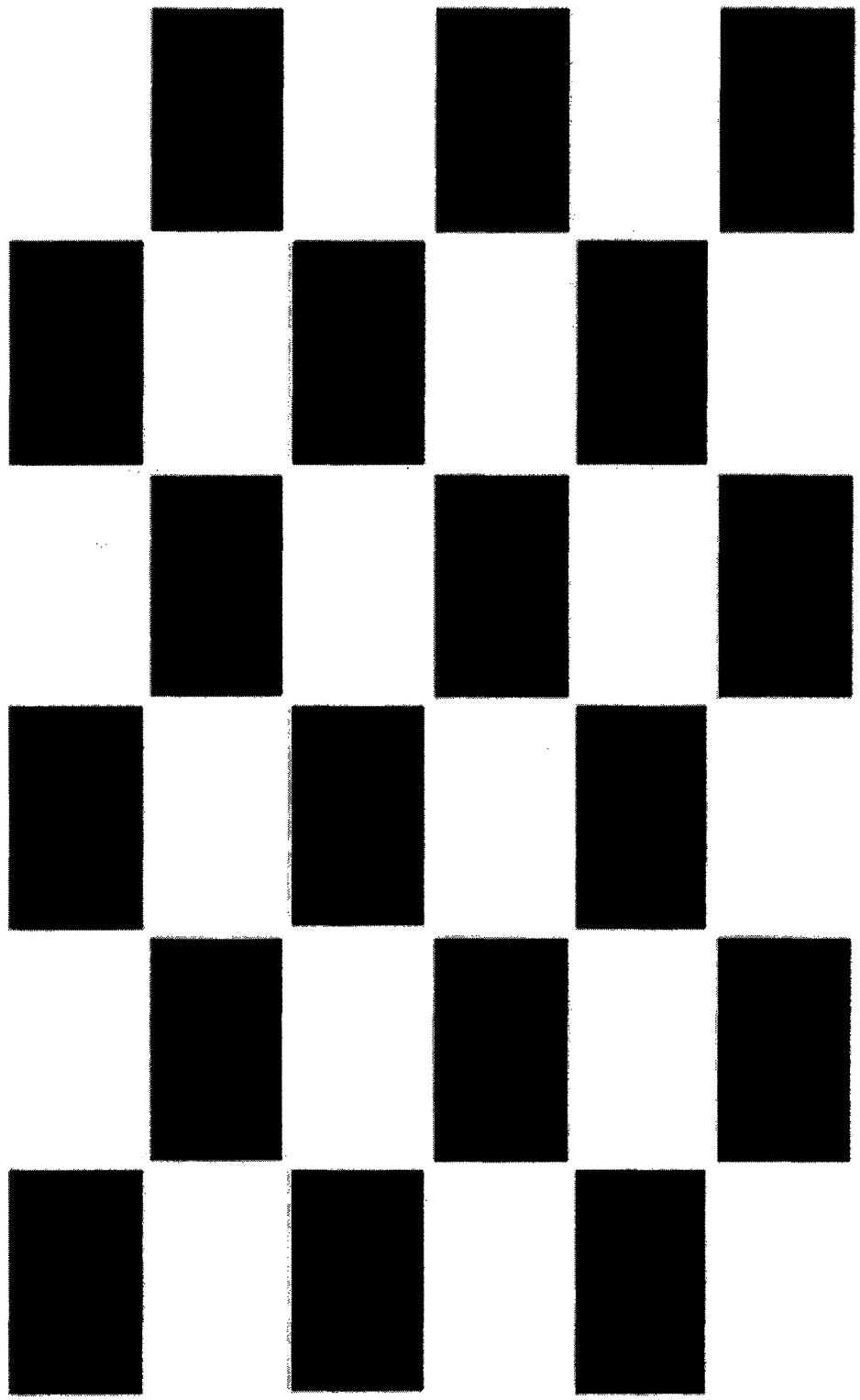
FIG. 25 is a diagram illustrating a parallax barrier according to a second embodiment of the invention.
Figure 27:
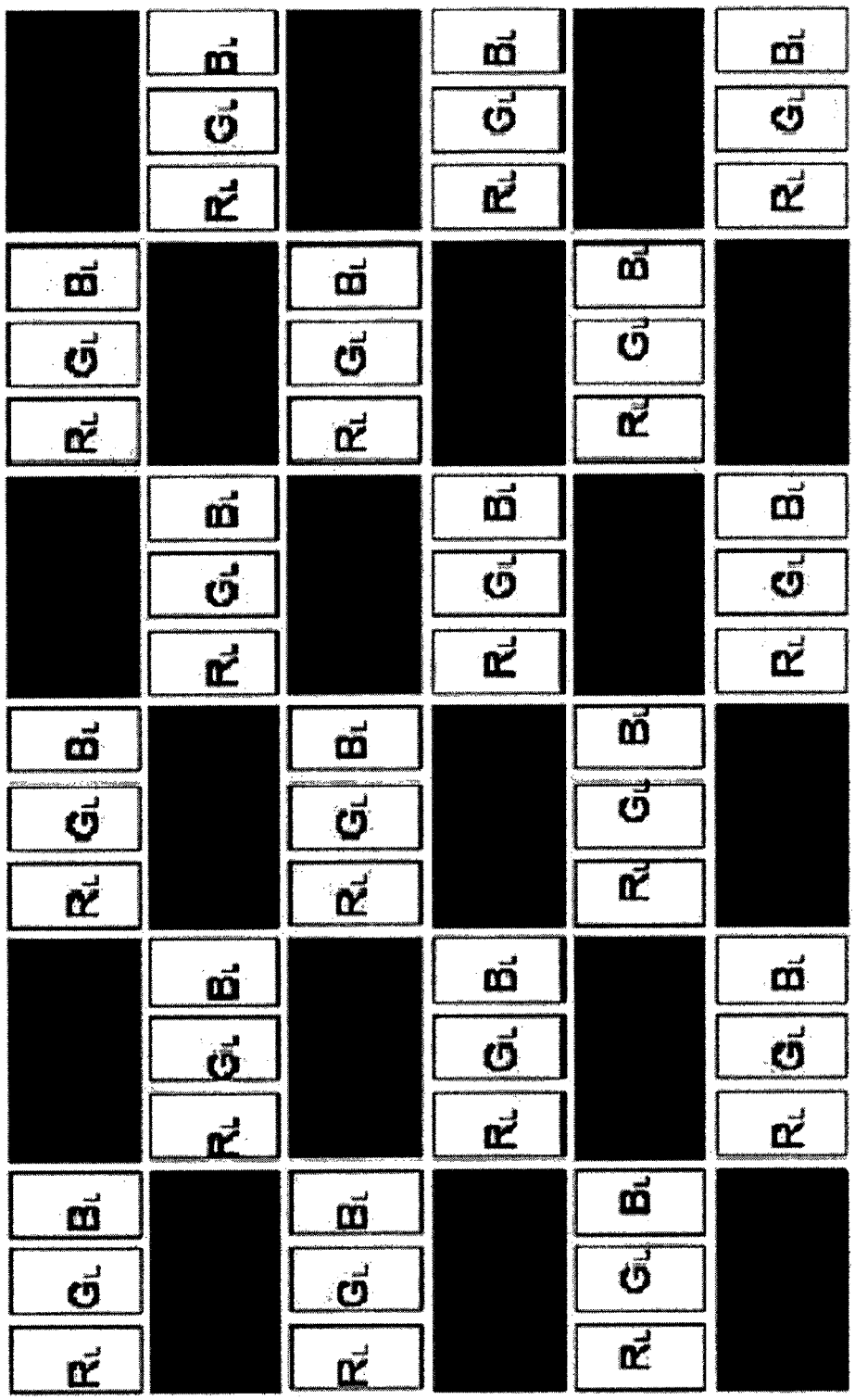
FIG. 27 is a diagram illustrating a left-eye image formed by the parallax barrier shown in FIG. 25 and the image display panel shown in FIG. 19.
Figure 28:
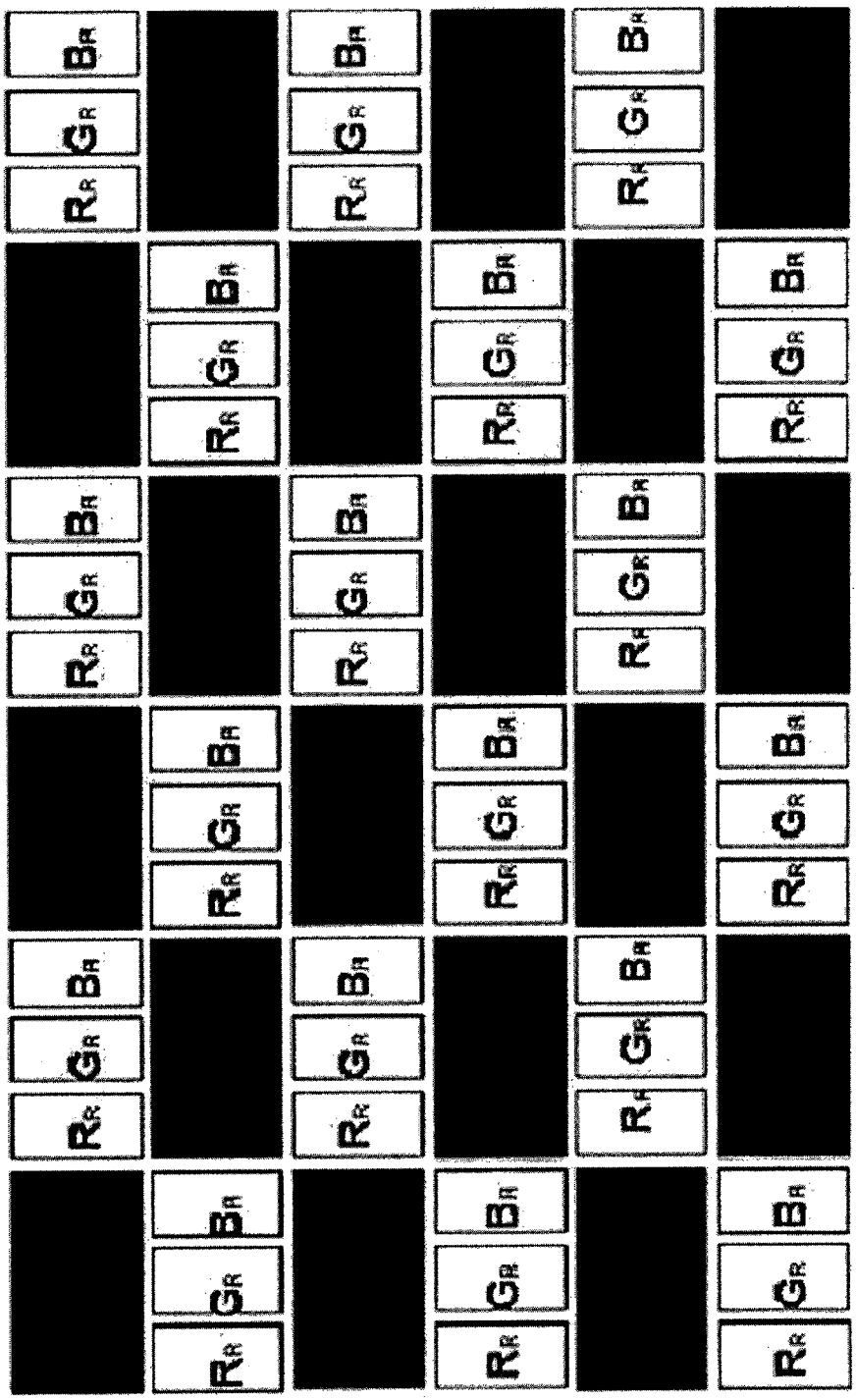
FIG. 28 is a diagram illustrating a right-eye image formed by the parallax barrier shown in FIG. 25 and the image display panel shown in FIG. 19.
Figure 29:
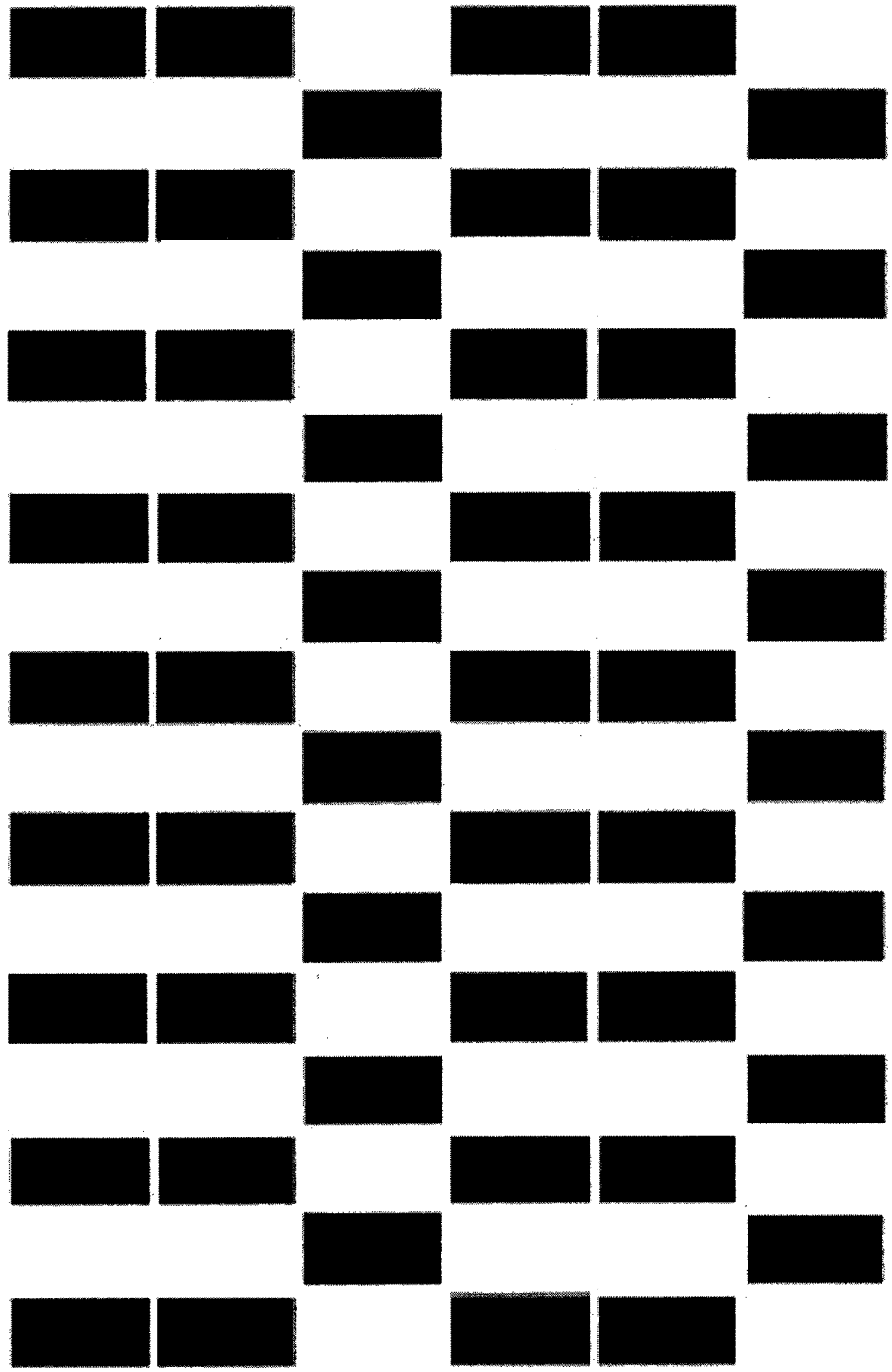
FIG. 29 is a diagram illustrating a parallax barrier according to a third embodiment of the invention.
Figure 31:
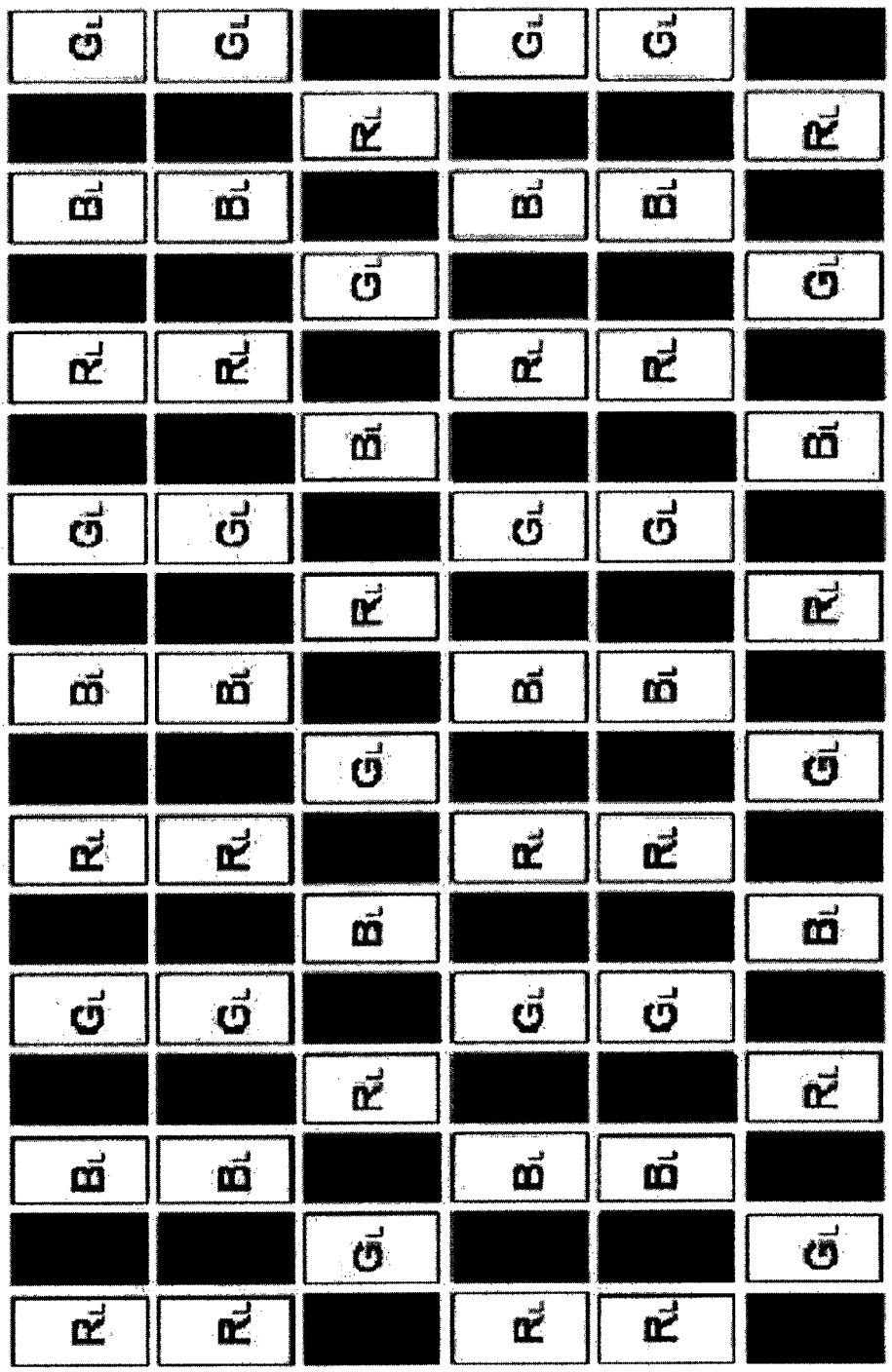
FIG. 31 is a diagram illustrating a left-eye image formed by the parallax barrier shown in FIG. 29 and the image display panel shown in FIG. 22.
Figure 32:
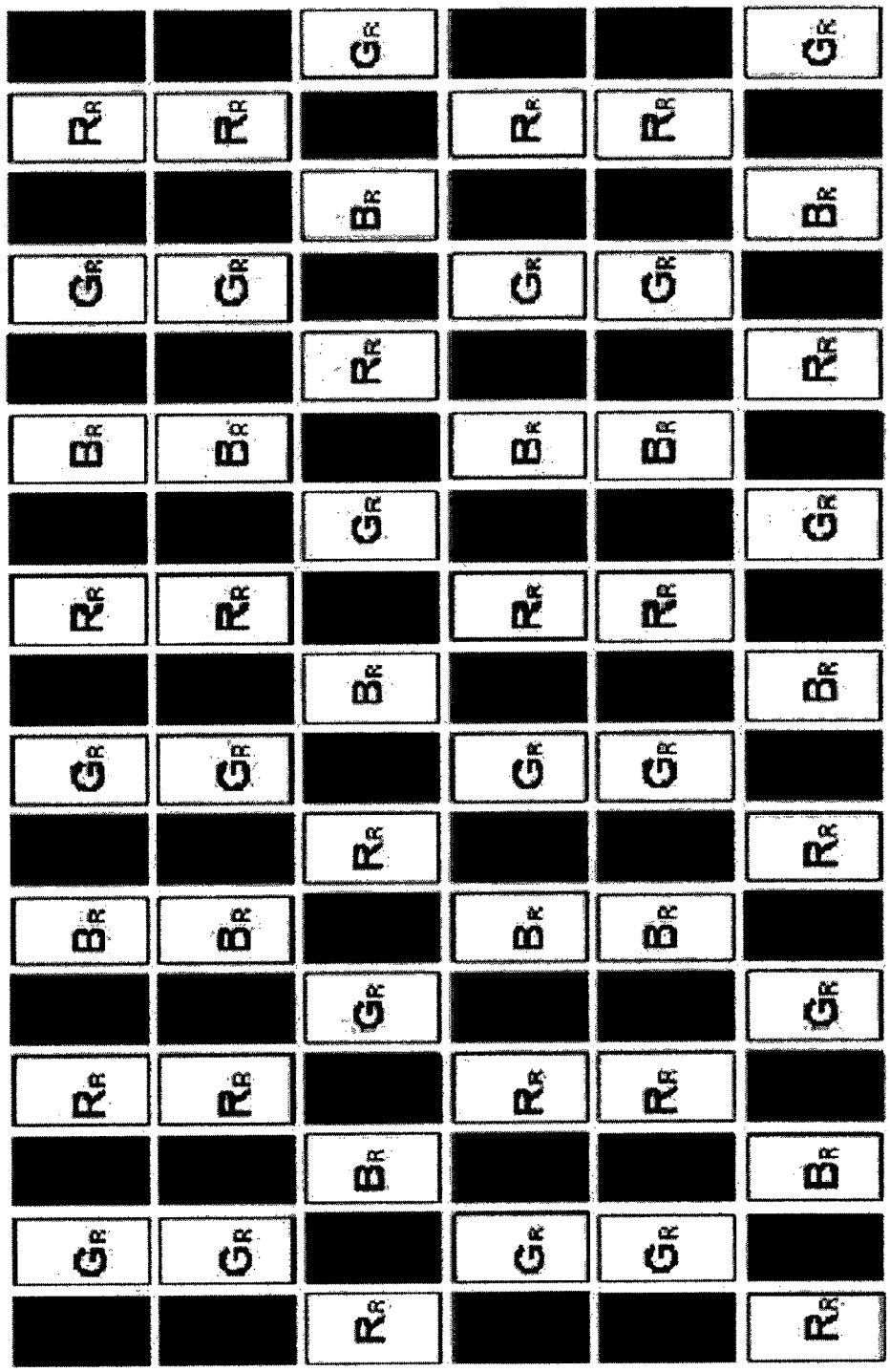
FIG. 32 is a diagram illustrating a right-eye image formed by the parallax barrier shown in FIG. 29 and the image display panel shown in FIG. 22.

The parallax barrier according to an embodiment of the invention is shown in FIGS. 9, 25, and 29. Unlike the known linear parallax barrier shown in FIG. 2, the parallax barrier according to an embodiment of the invention includes a plurality of parallax barrier pieces arranged in a predetermined pattern. The parallax barrier pieces are exaggerated in FIGS. 9, 25, and 29, but have a very small dot shape in practice.

Figure 3:
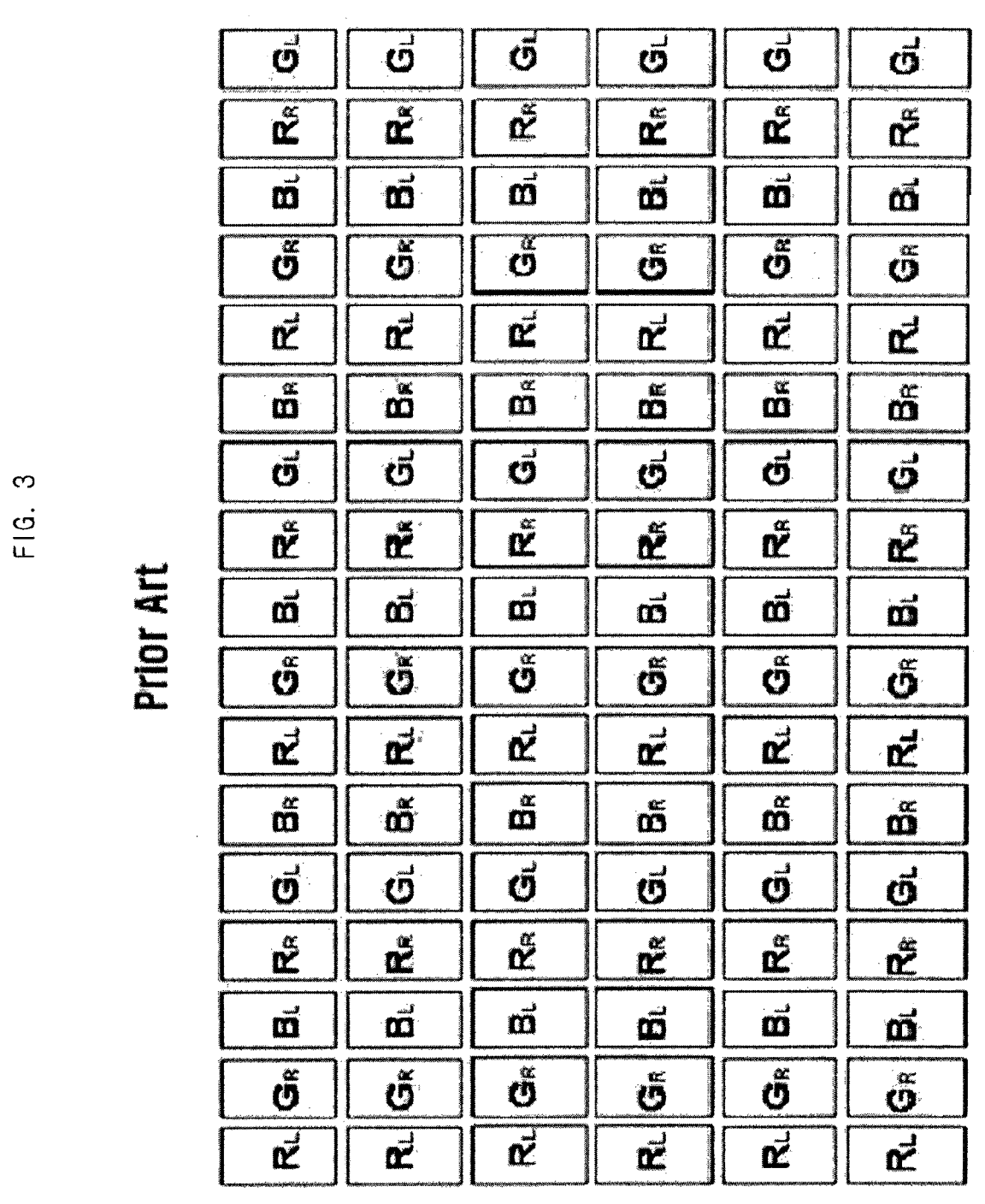
Figure 10:
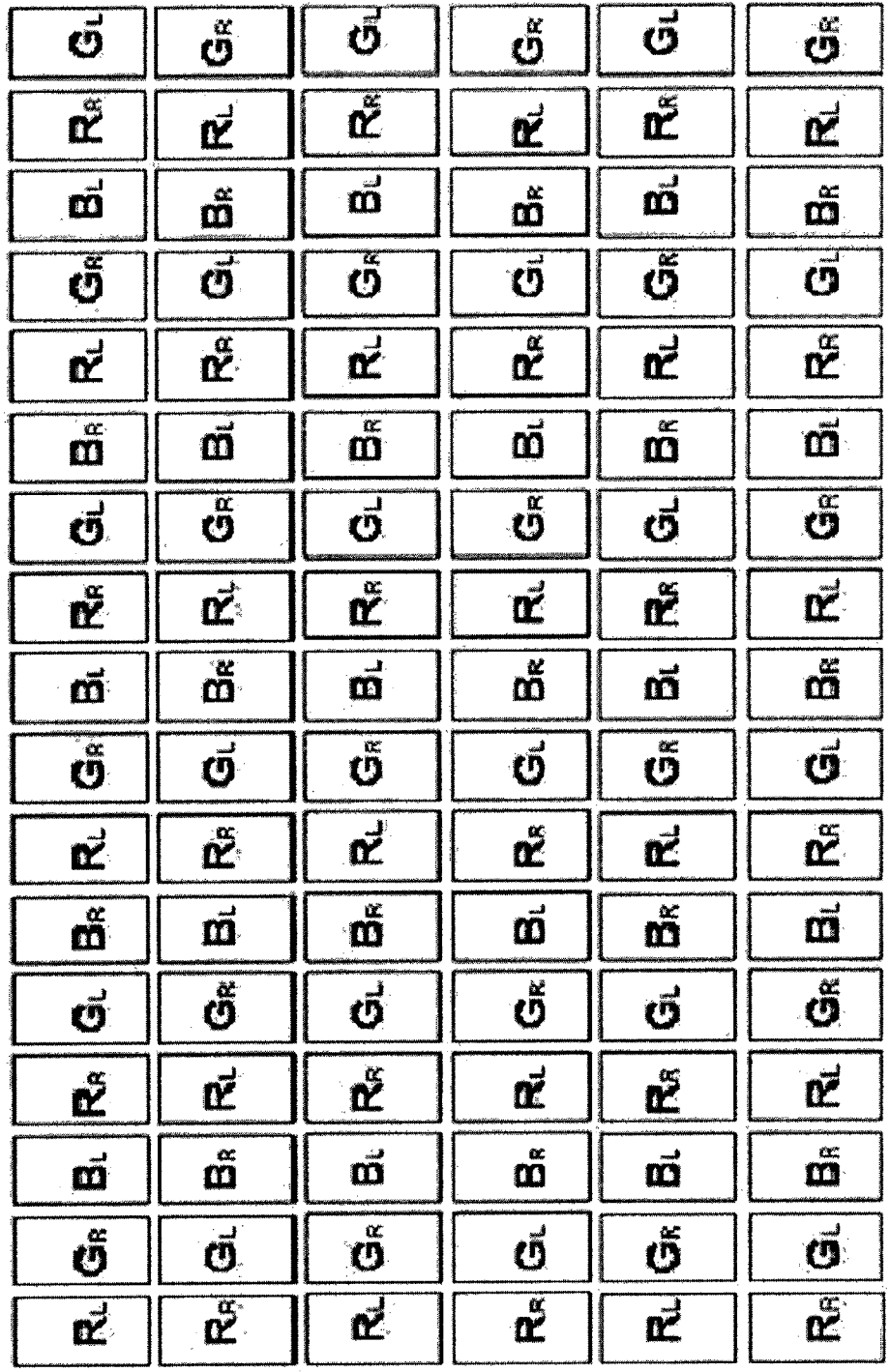
FIG. 10 is a diagram illustrating an image display panel according to the first embodiment of the invention.
Figure 19:
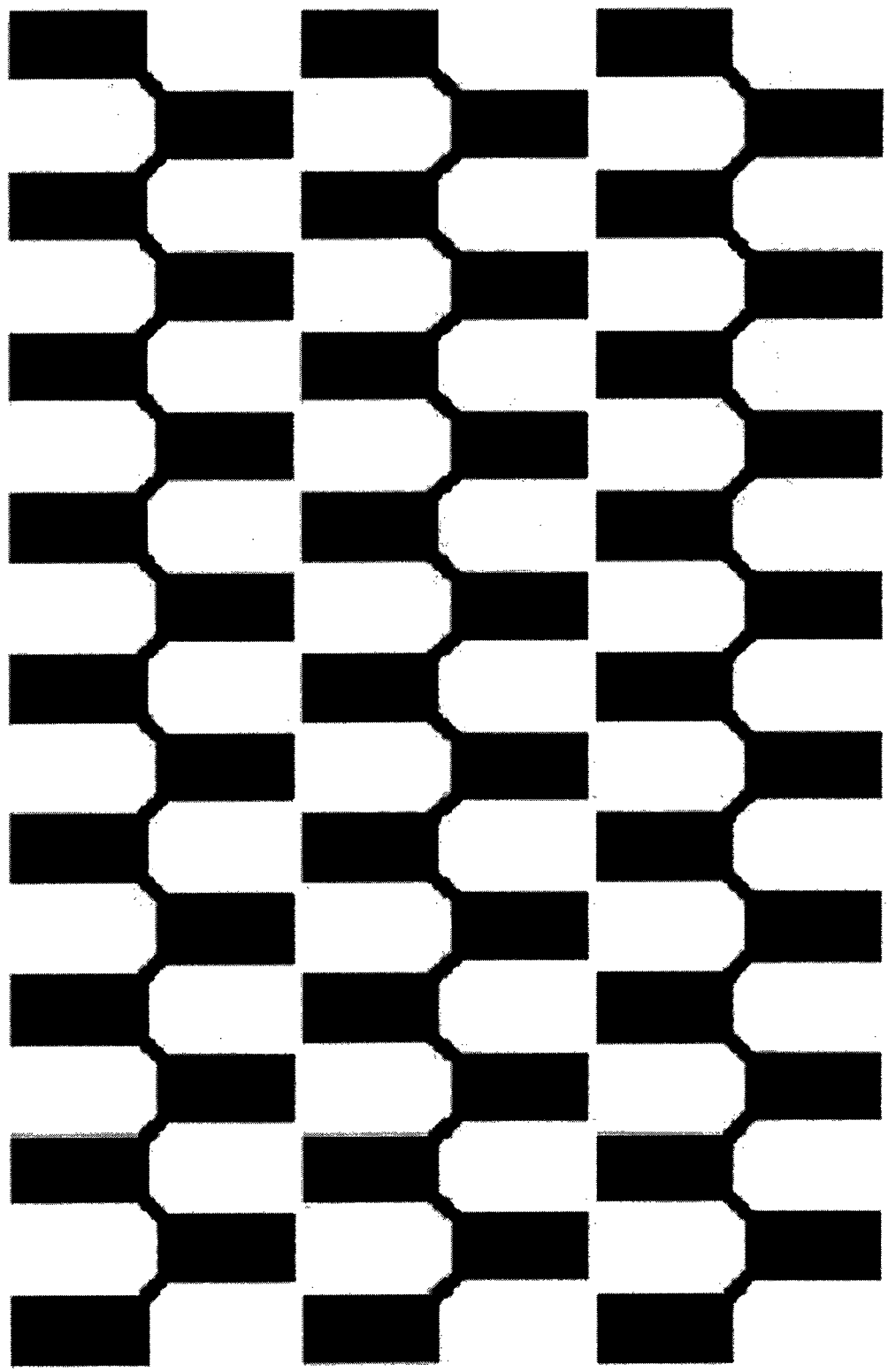
FIG. 19 is a diagram illustrating a third specific example of the parallax barrier according to the first embodiment of the invention.
Figure 30:
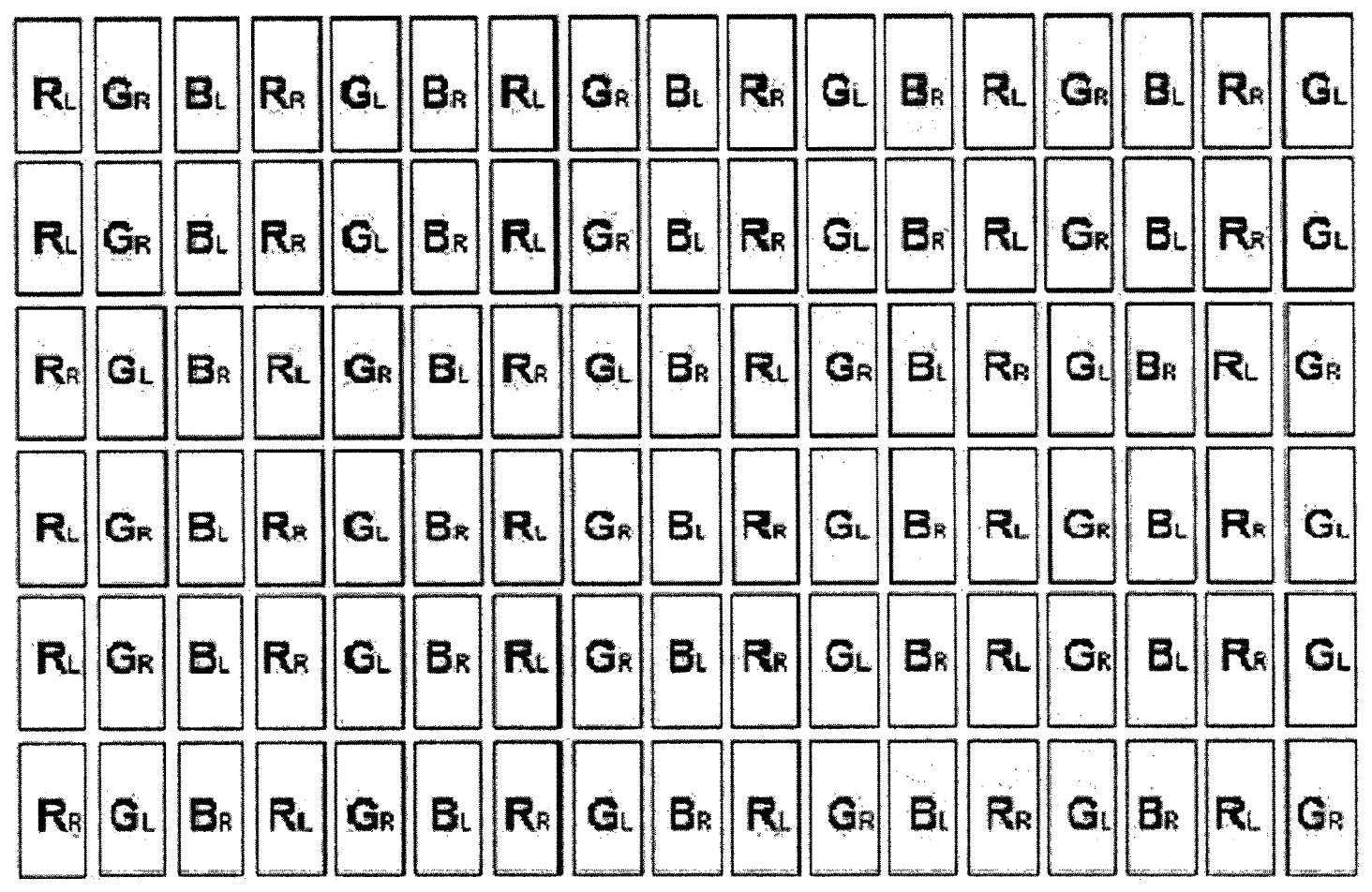

A 2D/3D convertible image display panel (hereinafter, briefly referred to as "image display panel") corresponding to the parallax barrier is shown in FIGS. 10, 19, and 30. In the known image display panel shown in FIG. 3, left-eye pixels and right-eye pixels are linearly arranged so as to correspond to the linear parallax barrier. One vertical line of pixels includes only one type of the left-eye pixels and the right-eye pixels and the adjacent vertical line of pixels includes the other type of the left-eye pixels and the right-eye pixels. In other words, the left-eye pixels and the right-eye pixels are disposed above and below the left-eye pixels and the right-eye pixels, respectively.

Figure 26:
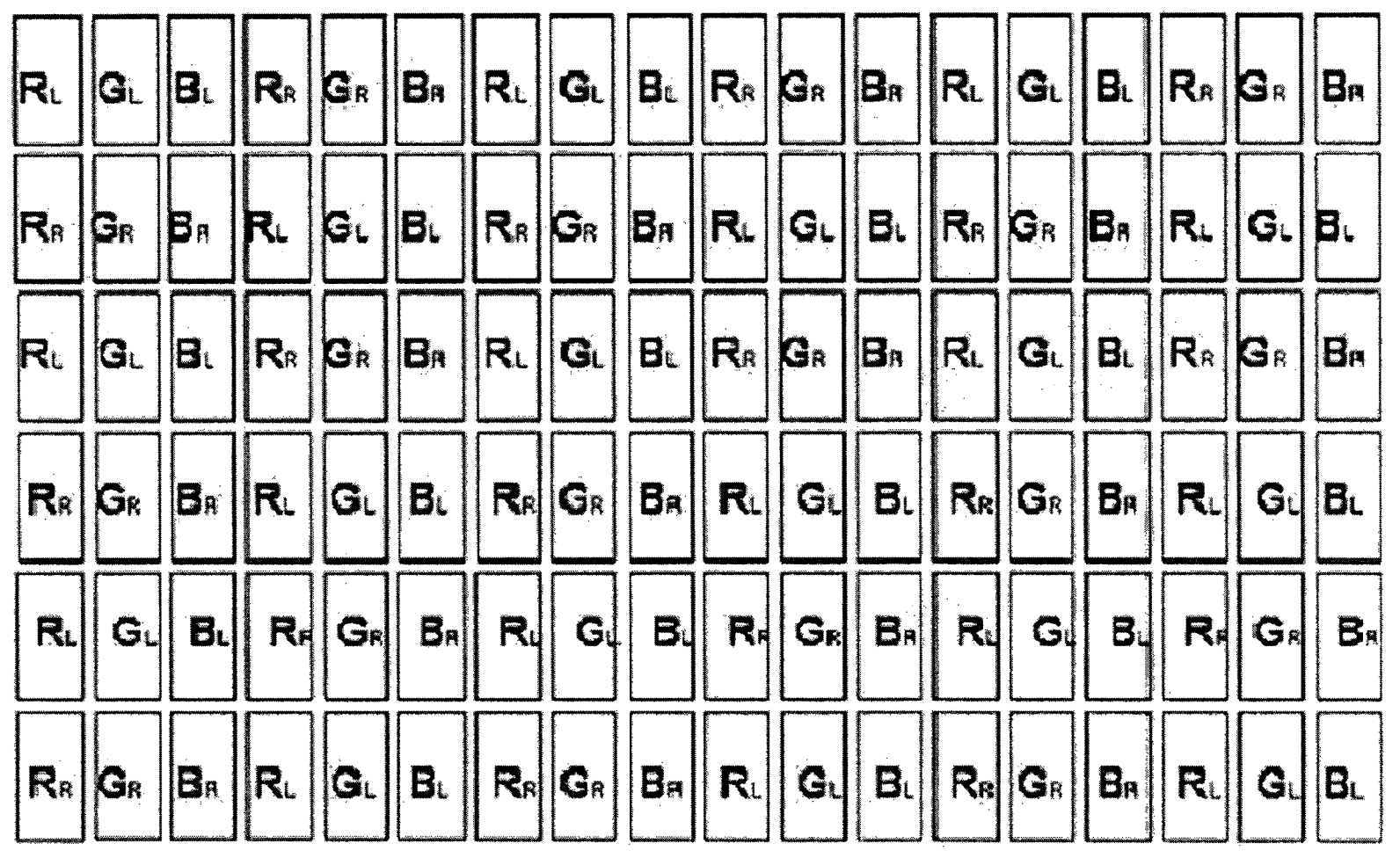

Unlike the known art, the image display panel according to the embodiments of the invention has a pixel pattern in which the left-eye sub pixels (or unit pixels) and the right-eye sub pixels (or unit pixels) are alternately arranged in the horizontal and vertical directions (see FIGS. 10 and 26) or a pixel pattern in which the left-eye sub pixels and the right-eye sub pixels are alternately arranged at an interval of a predetermined first number of pixels (3 in FIG. 26) in the horizontal direction and are alternately arranged at an interval of a predetermined second number of pixels (1 in FIG. 26) in the vertical direction (see FIG. 26). The first number of pixels and the second number of pixels may be interchanged. It will be easily understood by those skilled in the art that the numbers of pixels alternating in FIG. 26 can be selected arbitrarily as long as it does not damage the quality of a stereoscopic image. For example, the first number of pixels may be 1 and the second number of pixels may be 2.

According to the invention, the left-eye image and the right-eye image formed by the left-eye pixels and the right-eye pixels (sub pixels) are divided by the corresponding parallax barrier pieces and the left eye and the right eye recognize the left-eye image and the right-eye image, respectively, thereby recognizing a stereoscopic image without any strip pattern.

As described above, since the parallax barrier pieces have a dot shape, the dots of the parallax barrier pieces are displayed as if they were dispersed all over the entire screen. Accordingly, unlike the known art, the linear barrier shape is not displayed directly in the stereoscopic image. As a result, according to the invention, the linear barrier shape is removed, thereby obtaining a natural stereoscopic image.

EMBODIMENTS

Hereinafter, exemplary embodiments of the invention will be described with reference to the accompanying drawings.

First Embodiment

In a first exemplary embodiment of the invention, a left-eye image and a right-eye image are divided at the level of sub pixels.

The stereoscopic image display apparatus according to the first embodiment of the invention includes an image display panel and a parallax barrier having parallax barrier pieces disposed in the front of the image display panel. Here, the image display panel has a pixel pattern in which left-eye sub pixels and right-eye sub pixels are alternately arranged in horizontal and vertical directions. The parallax barrier is spaced apart from the image display panel by a predetermined distance and the parallax barrier pieces with a predetermined size are arranged at a predetermined interval in the horizontal and vertical directions so as to allow a left eye and a right eye to separately recognize a left-eye image and a right-eye image formed by the left-eye sub pixels and the right-eye sub pixels, respectively.

The parallax barrier according to the first embodiment of the invention is shown in FIG. 9. The parallax barrier according to the first embodiment of the invention includes a plurality of parallax barrier pieces arranged in a predetermined pattern. Although the parallax barrier pieces are exaggerated in FIGS. 9, 25, and 29, the parallax barrier pieces have a very small dot shape in practice. The parallax barrier pieces shown in FIG. 9 should be interconnected to each other through wires, but the wire interconnection is not shown for the purpose of convenience in explanation. The wire interconnection is described in specific examples to be described later.

The image display panel corresponding to the parallax barrier is shown in FIG. 10. The image display panel according to the first embodiment of the invention has a pixel pattern in which the left-eye sub pixels and the right-eye sub pixels are alternately arranged in the horizontal and vertical directions.

Figure 11:
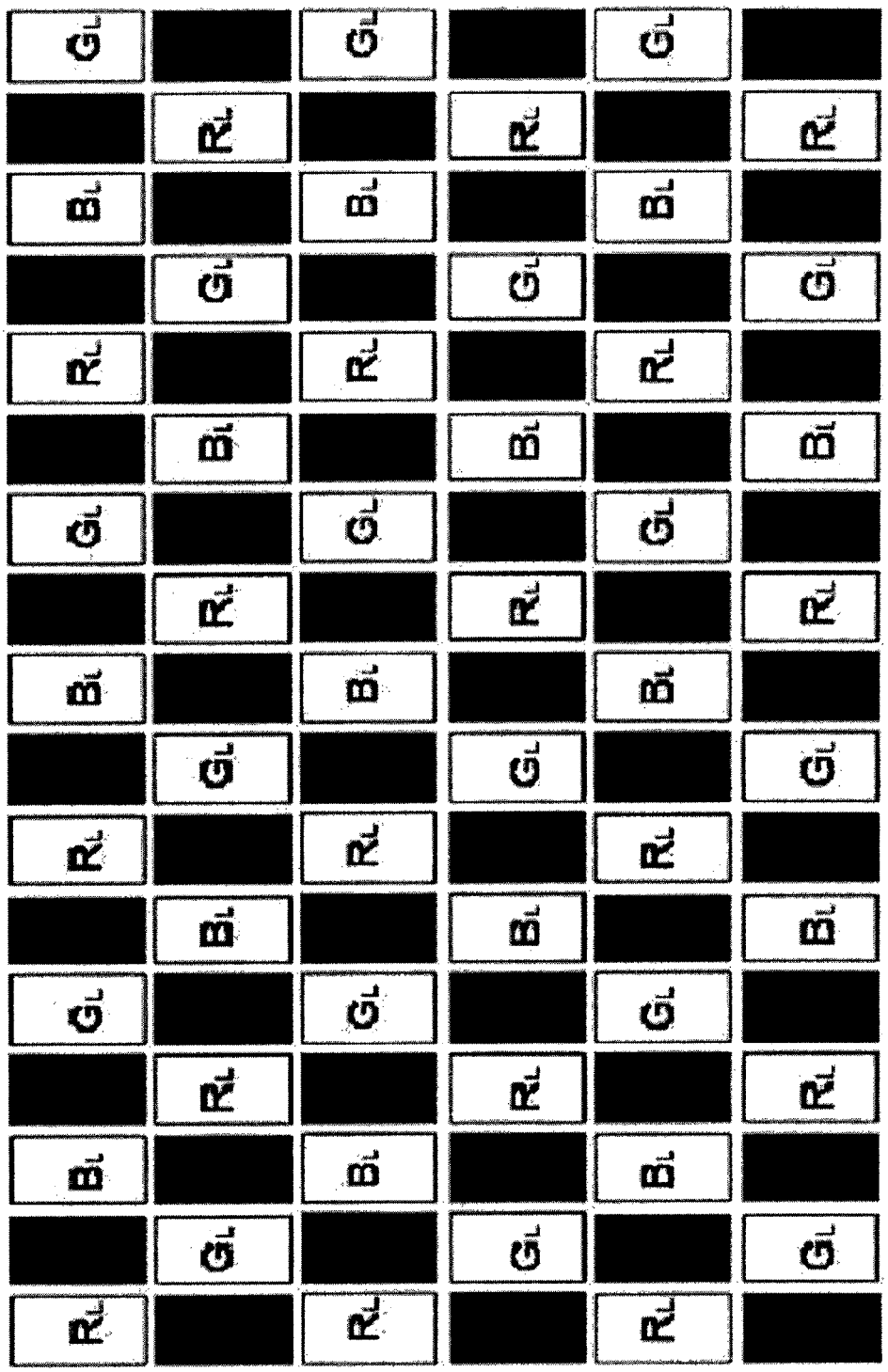
FIG. 11 is a diagram illustrating a left-eye image formed by the parallax barrier shown in FIG. 9 and the image display panel shown in FIG. 10.
Figure 12:
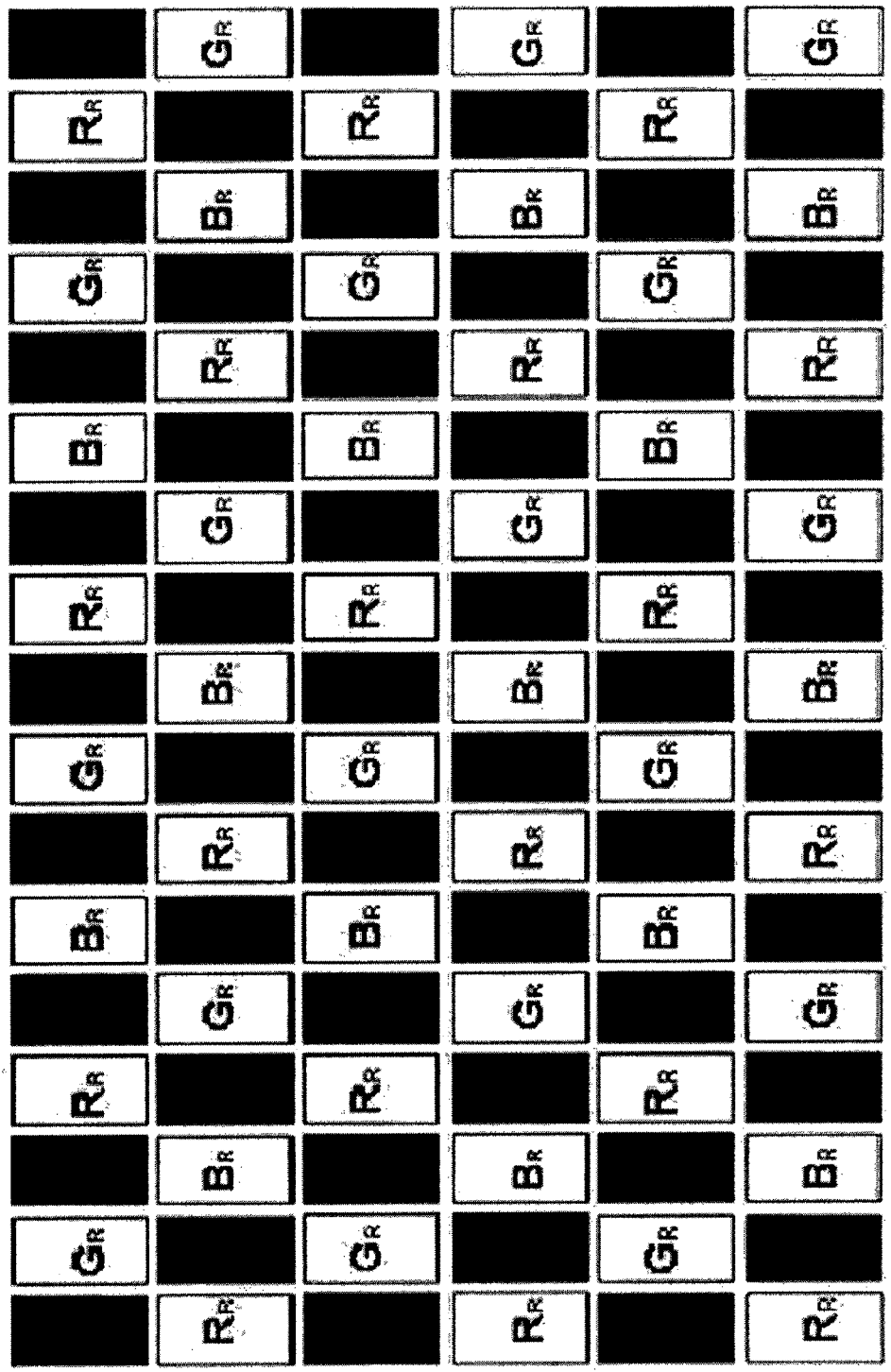
FIG. 12 is a diagram illustrating a right-eye image formed by the parallax barrier shown in FIG. 9 and the image display panel shown in FIG. 10.

FIGS. 11 and 12 are diagrams illustrating the left-eye image and the right-eye image formed by the parallax barrier shown in FIG. 9 and the image display panel shown in FIG. 10. According to the first embodiment of the invention, the left-eye image and the right-eye image formed by the left-eye pixels and the right-eye pixels are divided by the corresponding parallax barrier pieces and the left eye and the right eye are allowed to recognize the left-eye image and the right-eye image, respectively, thereby recognizing a stereoscopic image without any strip pattern.

As described above, since the parallax barrier pieces have a dot shape, the dots of the parallax barrier pieces are displayed as if they were dispersed all over the entire screen. Accordingly, unlike the known art, the linear barrier shape is not displayed directly in the stereoscopic image. As a result, according to the invention, the linear barrier shape is removed, thereby obtaining a natural stereoscopic image.

Unlike a third embodiment to be described later, the left-eye image and the right-eye image are separated at the level of RGB pixels which are sub pixels, without acquiring a stereoscopic image by setting the RGB pixels as a unit pixel and classifying the unit pixels into the left-eye pixels and the right-eye pixels. Accordingly, a color mixing phenomenon does not occur, thereby obtaining a stereoscopic image having clear colors.

On the other hand, the first embodiment of the invention can be embodied as several specific examples depending on methods of interconnecting the parallax barrier pieces. However, the interconnection pattern of the parallax barrier is not limited to the following specific examples, but may be a repeated interconnection pattern in which the parallax barrier pieces are interconnected in predetermined combinations. Now, specific examples relating to the interconnection of the parallax barrier pieces will be described with reference to the drawings.

First Specific Examples

Figure 13:
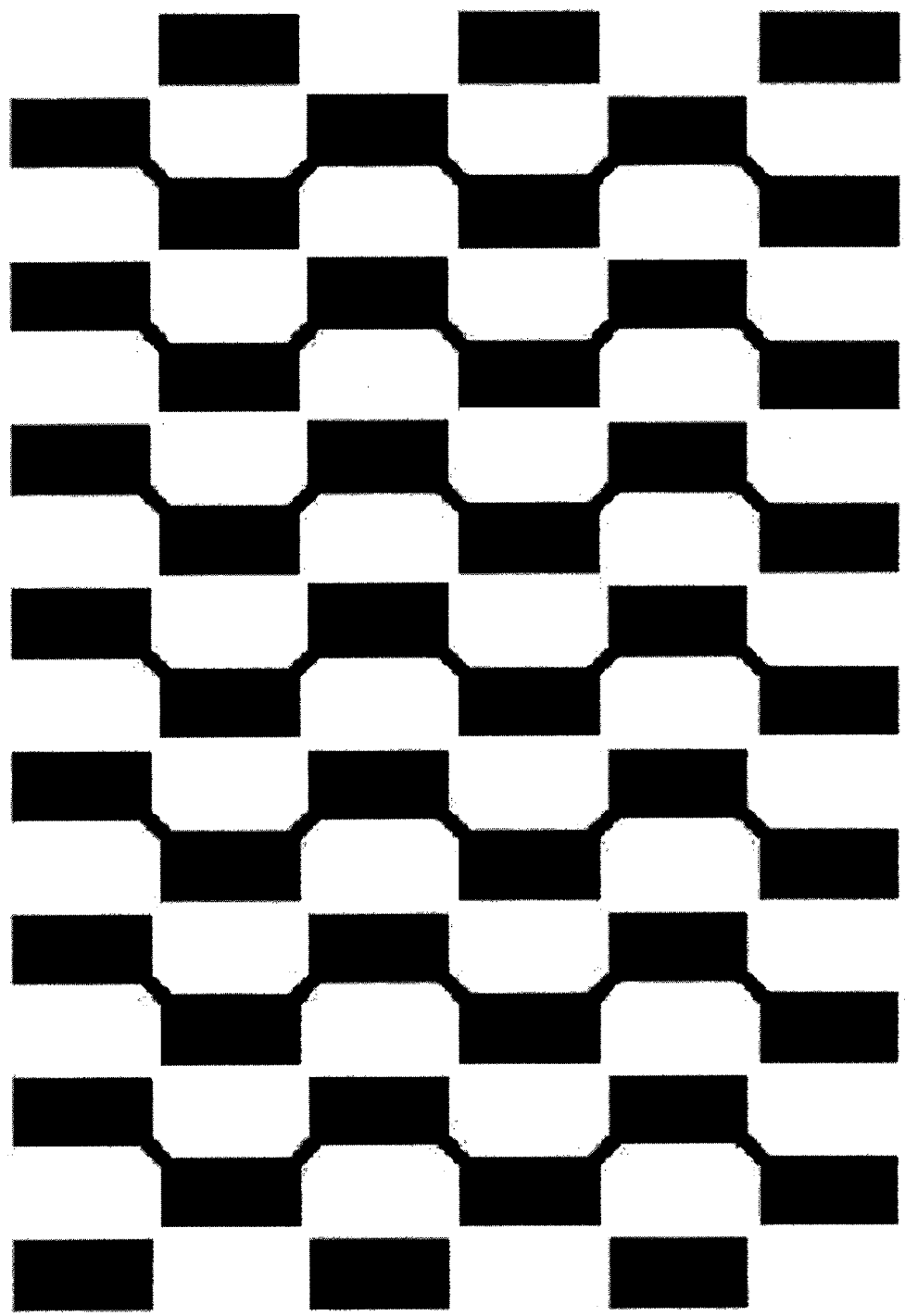
FIG. 13 is a diagram illustrating a first specific example of the parallax barrier according to the first embodiment of the invention.

A parallax barrier according to a first specific example of the first embodiment of the invention is shown in FIG. 13. The image display panel shown in FIG. 10 is used as an image display panel.

The parallax barrier has a repeated pattern in which a first piece in a first vertical line of the parallax barrier pieces is interconnected to a second piece which is a piece in a second vertical line adjacent to the right side of the first vertical line and which is adjacent to the right-lower side of the first piece, and the second piece is interconnected to a third piece which is a piece in the first vertical line and which is adjacent to the left-lower side of the second piece.

Figure 14:
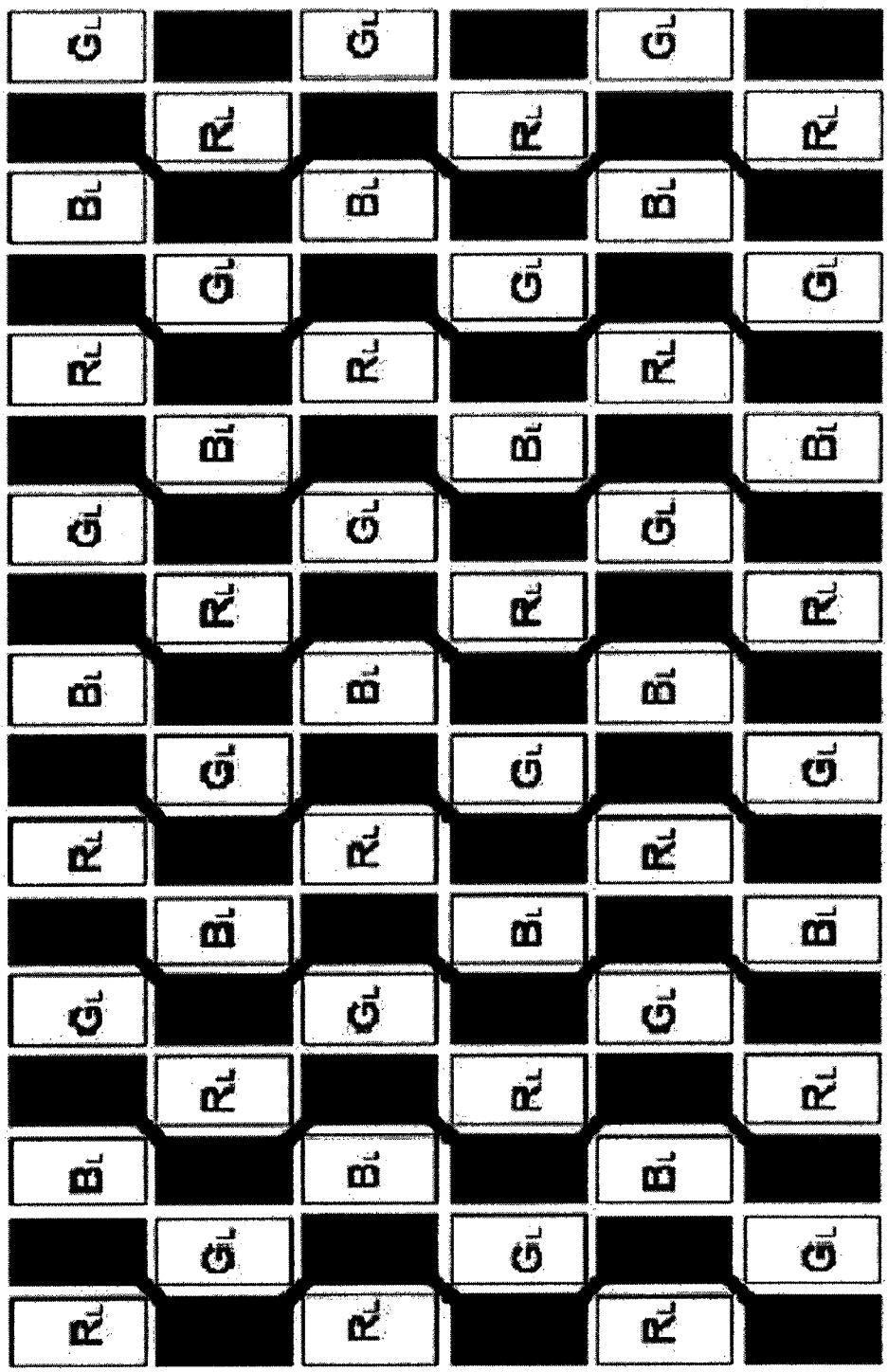
FIG. 14 is a diagram illustrating a left-eye image formed by the parallax barrier shown in FIG. 13 and the image display panel shown in FIG. 10.
Figure 15:
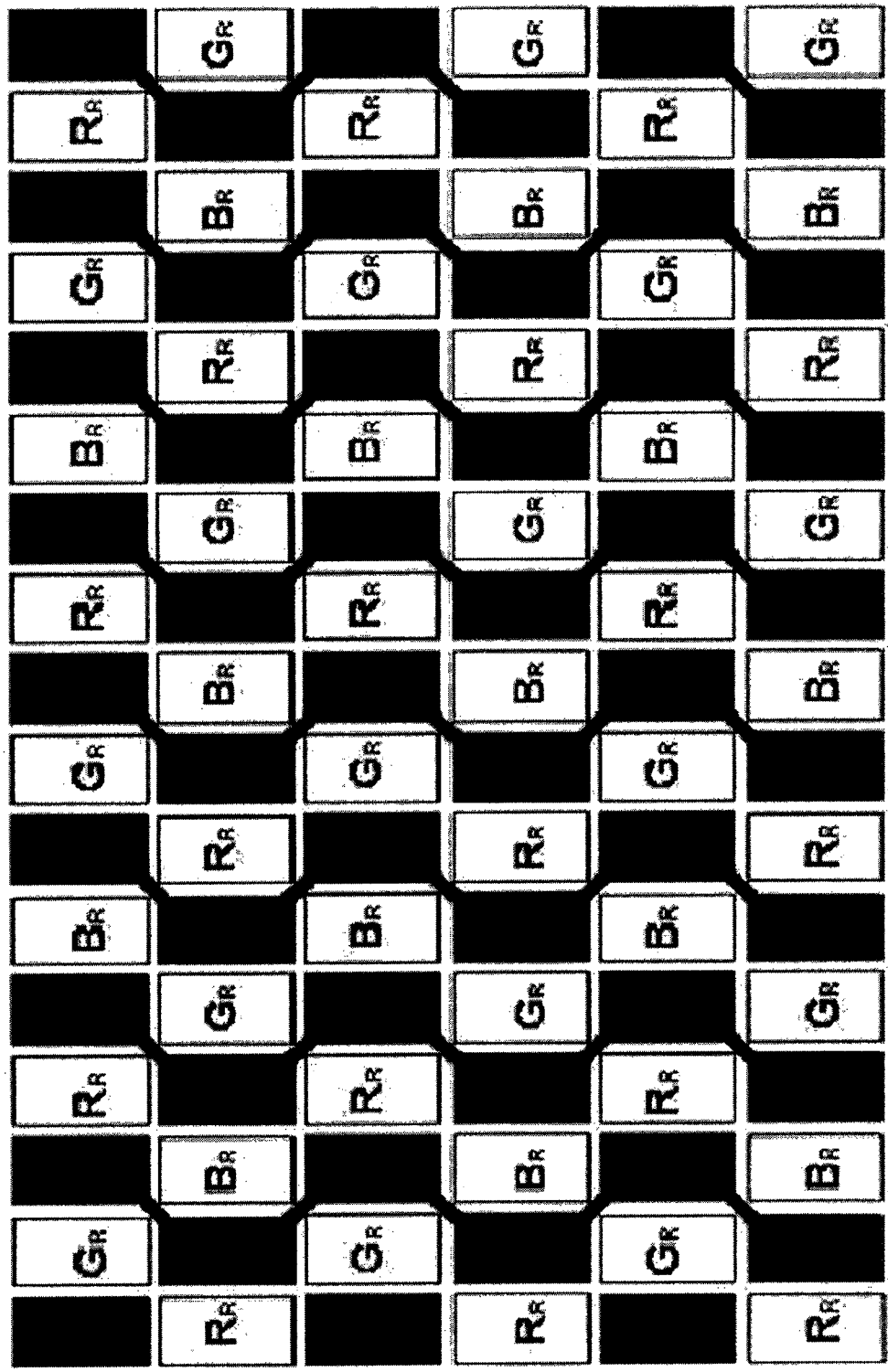
FIG. 15 is a diagram illustrating a right-eye image formed by the parallax barrier shown in FIG. 13 and the image display panel shown in FIG. 10.

FIGS. 14 and 15 are diagrams illustrating the left-eye image and the right-eye image formed by the parallax barrier shown in FIG. 13 and the image display panel shown in FIG. 10.

According to the first specific example, the linear barrier shape is removed, thereby obtaining a natural stereoscopic image.

Second Specific Example

Figure 16:
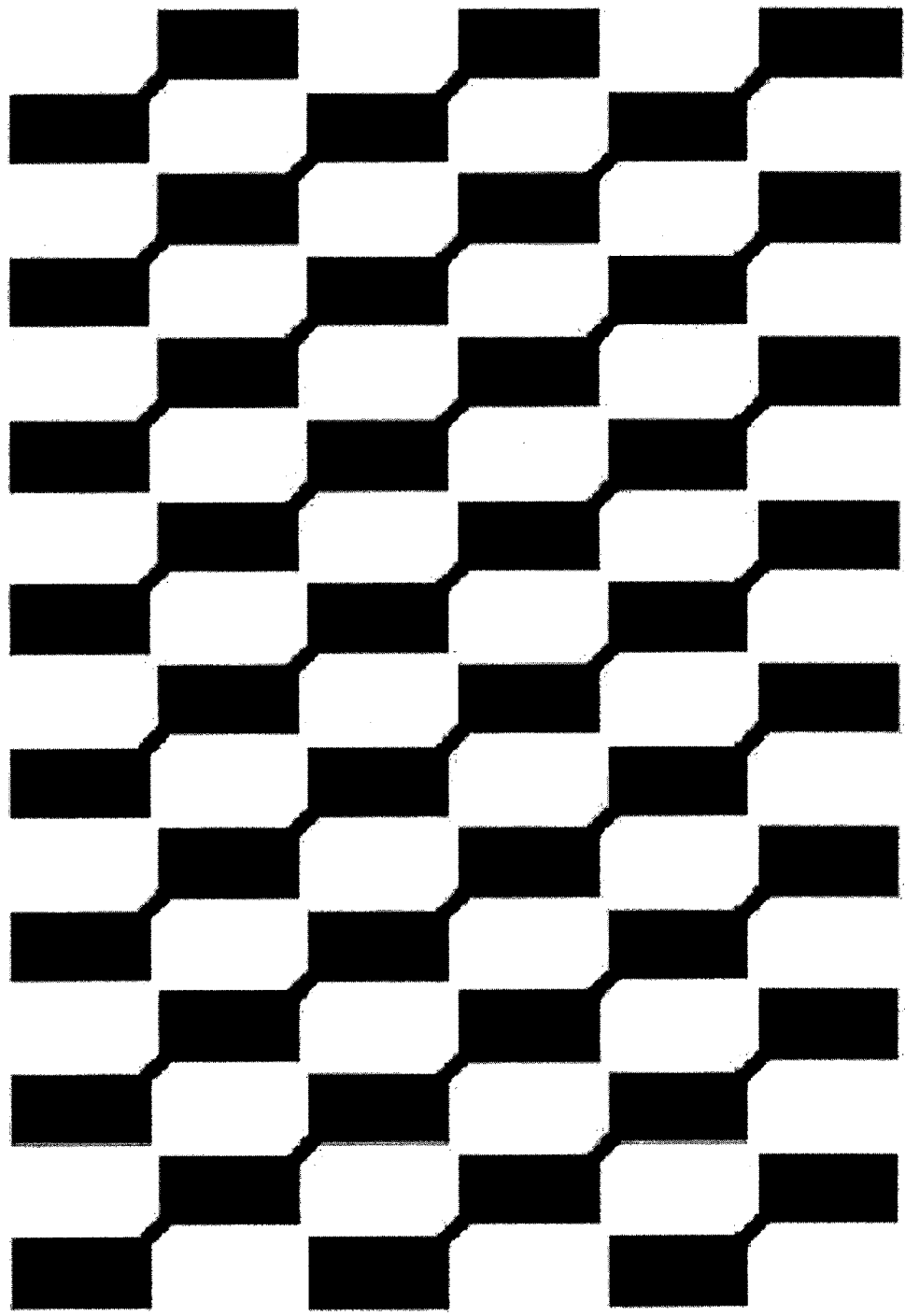
FIG. 16 is a diagram illustrating a second specific example of the parallax barrier according to the first embodiment of the invention.

A parallax barrier according to a second specific example of the first embodiment of the invention is shown in FIG. 16. The image display panel shown in FIG. 10 is used as an image display panel.

The parallax barrier has a repeated pattern in which a first piece in a first vertical line of the parallax barrier pieces is interconnected to a second piece which is a piece in a second vertical line adjacent to the right side of the first vertical line and which is adjacent to the right-lower side of the first piece and the second piece is interconnected to a third piece which is a piece in a third vertical line adjacent to the right side of the second vertical line and which is adjacent to the right-lower side of the second piece.

Figure 17:
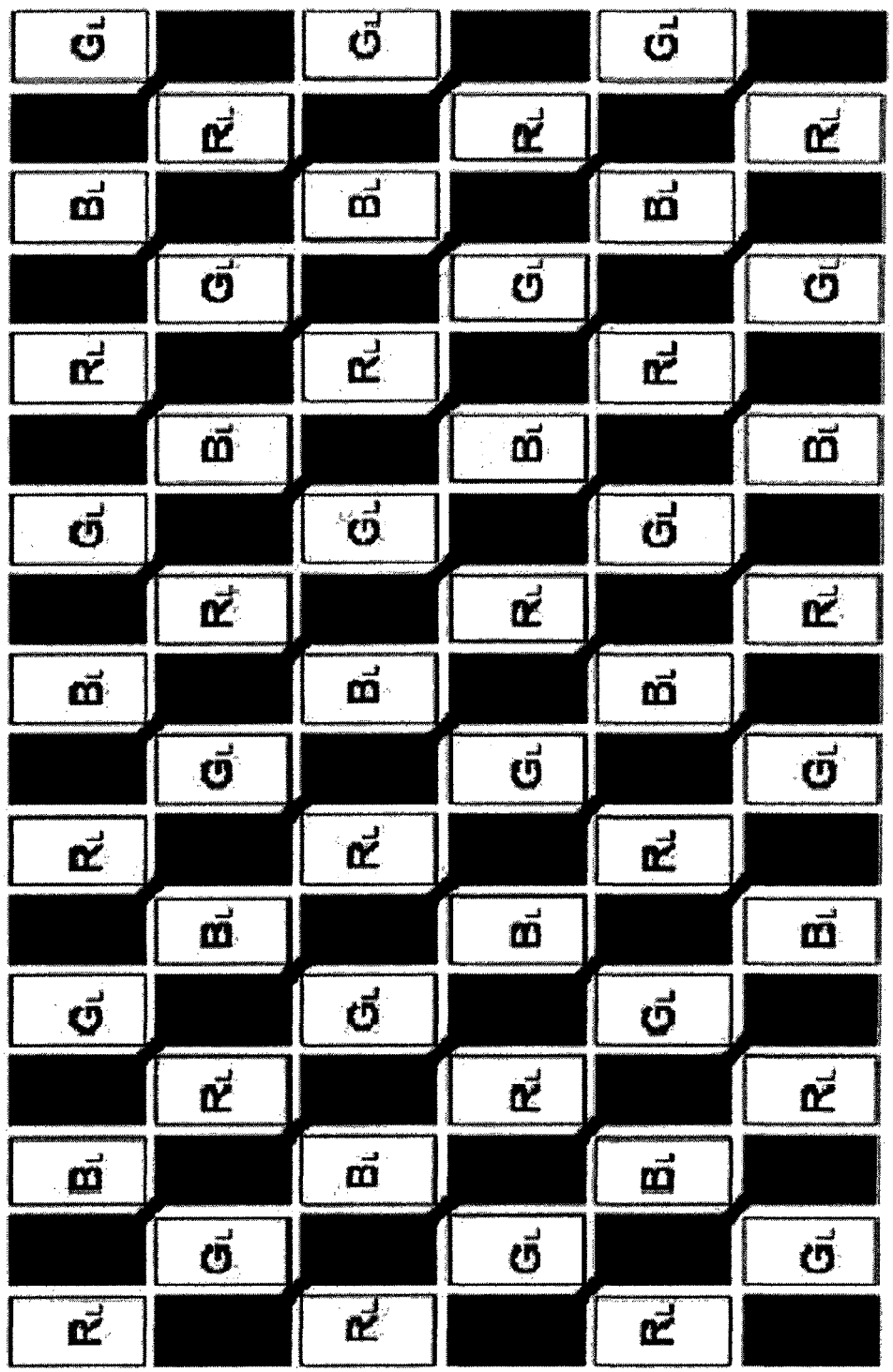
FIG. 17 is a diagram illustrating a left-eye image formed by the parallax barrier shown in FIG. 16 and the image display panel shown in FIG. 10.
Figure 18:
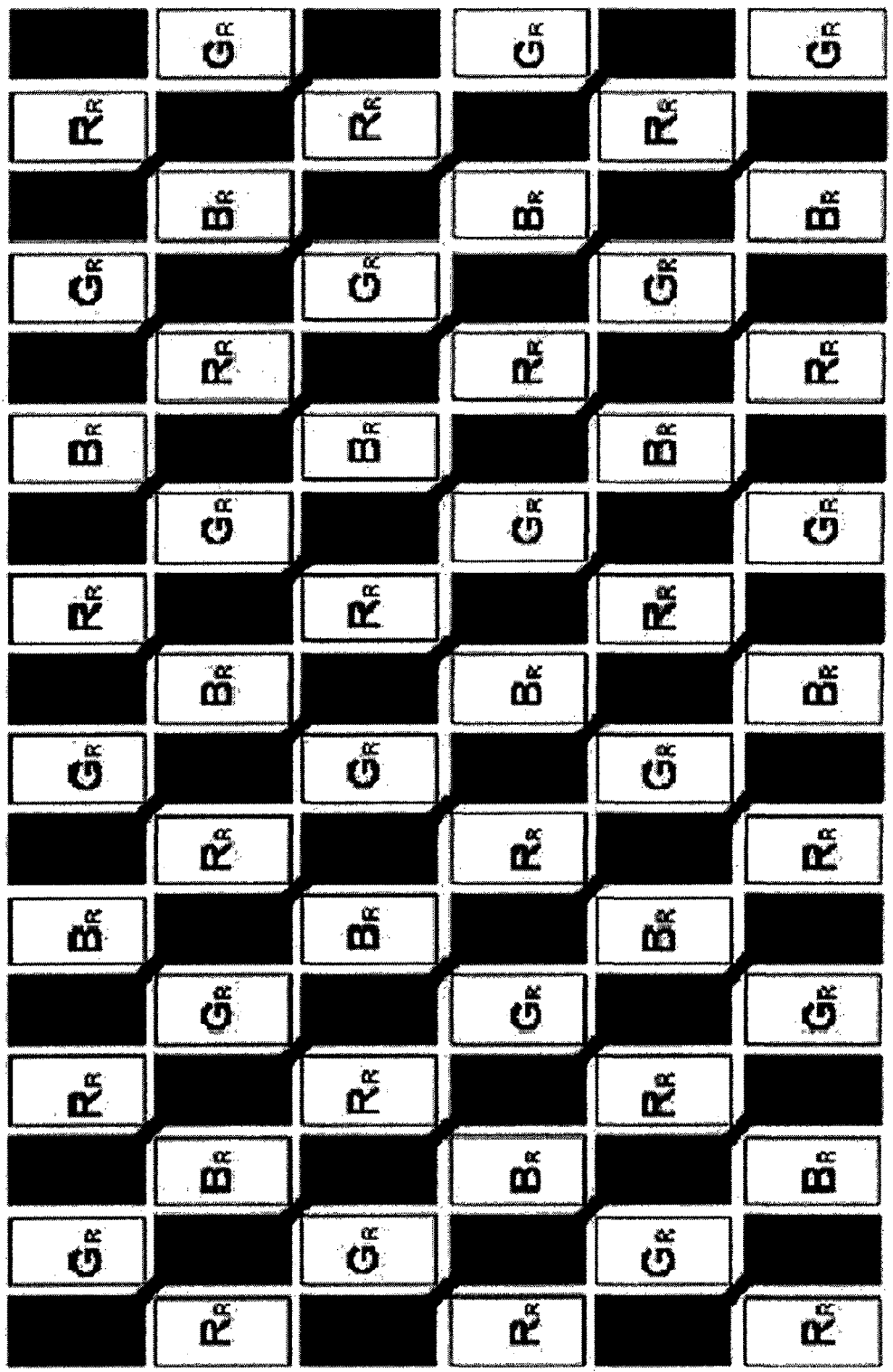
FIG. 18 is a diagram illustrating a right-eye image formed by the parallax barrier shown in FIG. 16 and the image display panel shown in FIG. 10.

FIGS. 17 and 18 are diagrams illustrating the left-eye image and the right-eye image formed by the parallax barrier shown in FIG. 16 and the image display panel shown in FIG. 10.

According to the second specific example, the linear barrier shape is removed, thereby obtaining a natural stereoscopic image.

Third Specific Example

A parallax barrier according to a third specific example of the first embodiment of the invention is shown in FIG. 19. The image display panel shown in FIG. 10 is used as an image display panel.

The parallax barrier has a repeated pattern in which a first piece in a first horizontal line of the parallax barrier pieces is interconnected to a second piece which is a piece in a second horizontal line adjacent to the lower side of the first horizontal line and which is adjacent to the right-lower side of the first piece and the second piece is interconnected to a third piece which is a piece in the first horizontal line and which is adjacent to the right-upper side of the second piece.

Figure 20:
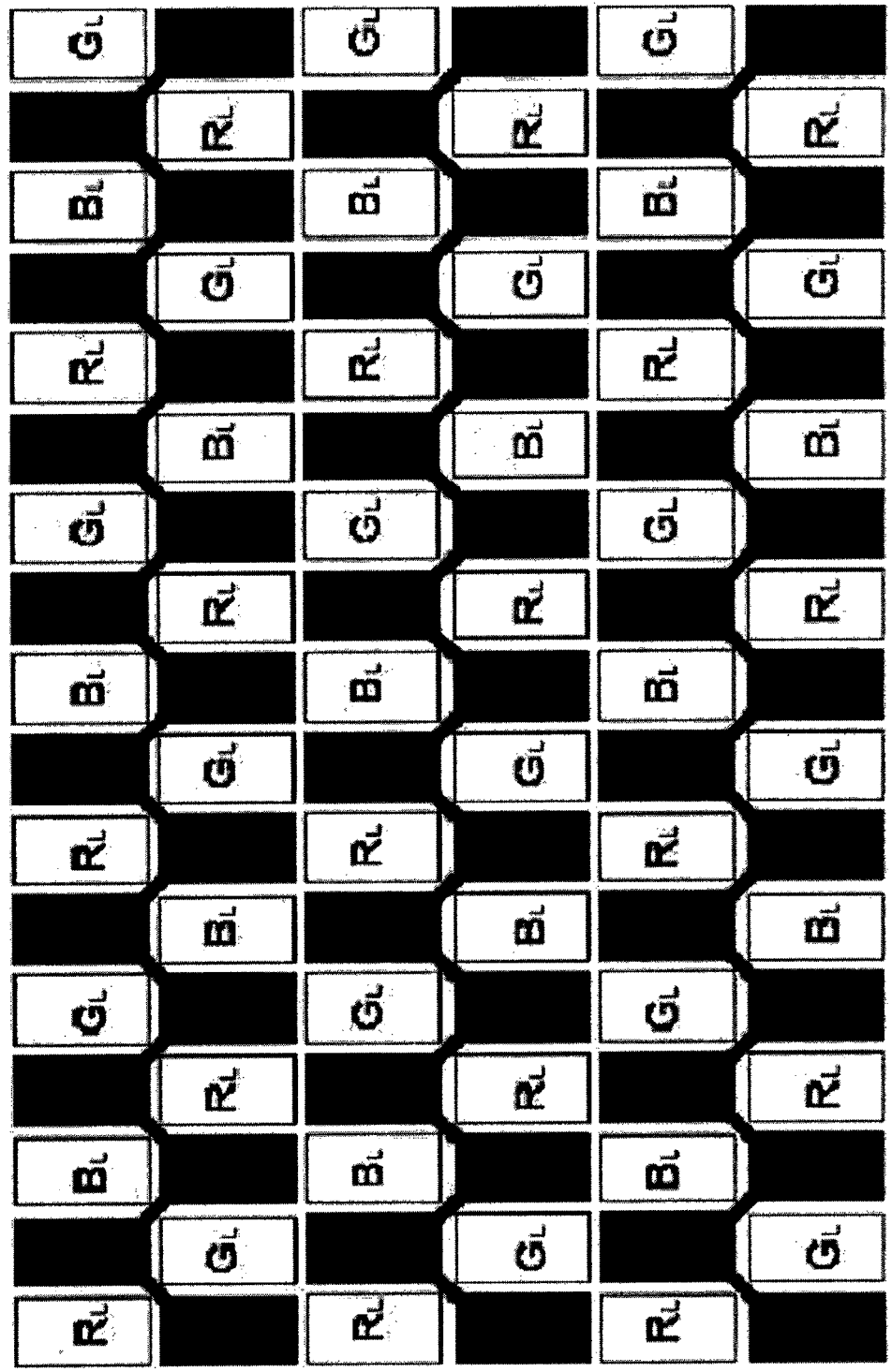
FIG. 20 is a diagram illustrating a left-eye image formed by the parallax barrier shown in FIG. 19 and the image display panel shown in FIG. 10.
Figure 21:
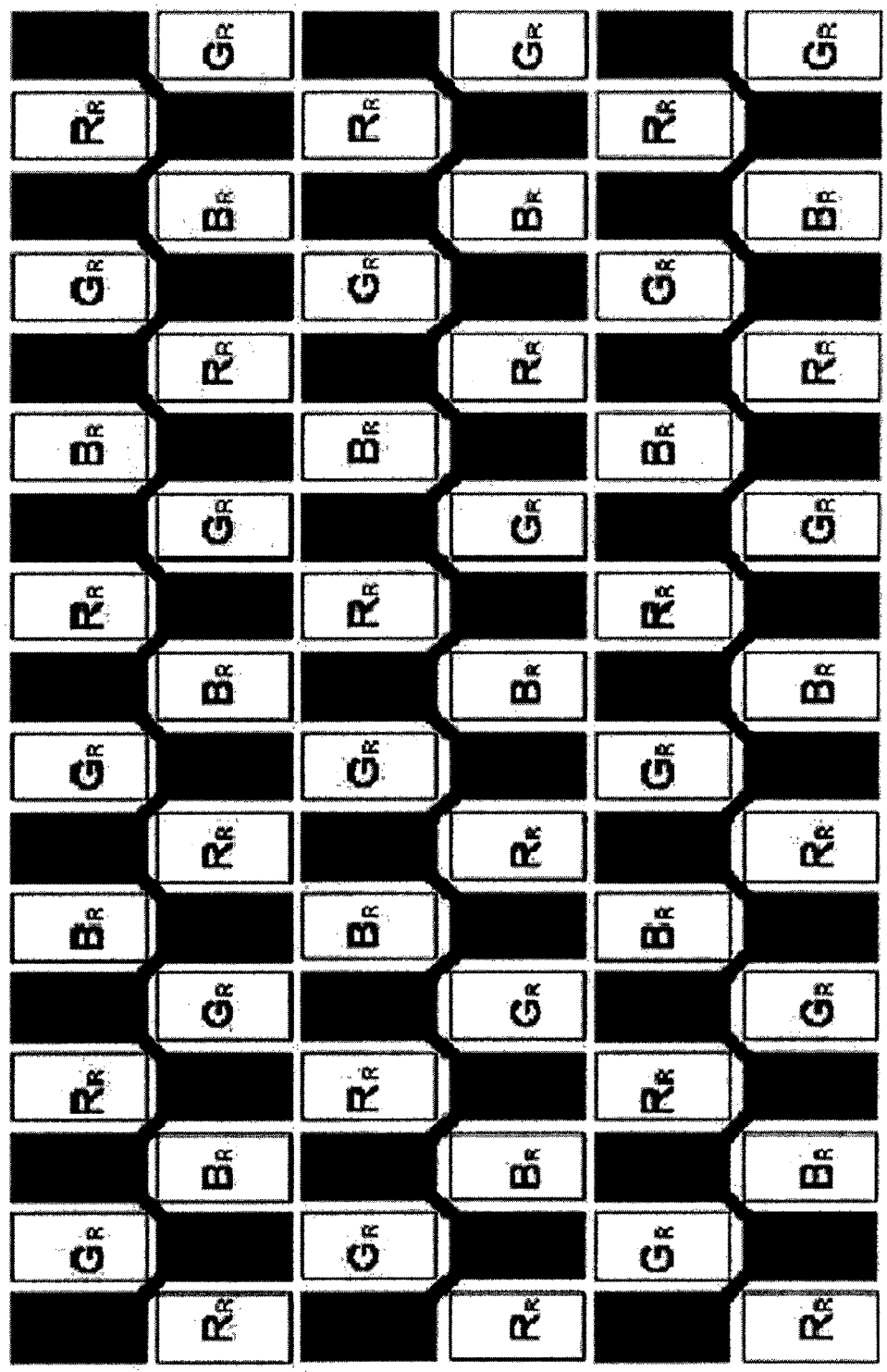
FIG. 21 is a diagram illustrating a right-eye image formed by the parallax barrier shown in FIG. 19 and the image display panel shown in FIG. 10.

FIGS. 20 and 21 are diagrams illustrating the left-eye image and the right-eye image formed by the parallax barrier shown in FIG. 19 and the image display panel shown in FIG. 10.

According to the third specific example, the linear barrier shape is removed, thereby obtaining a natural stereoscopic image.

Fourth Specific Example

Figure 22:
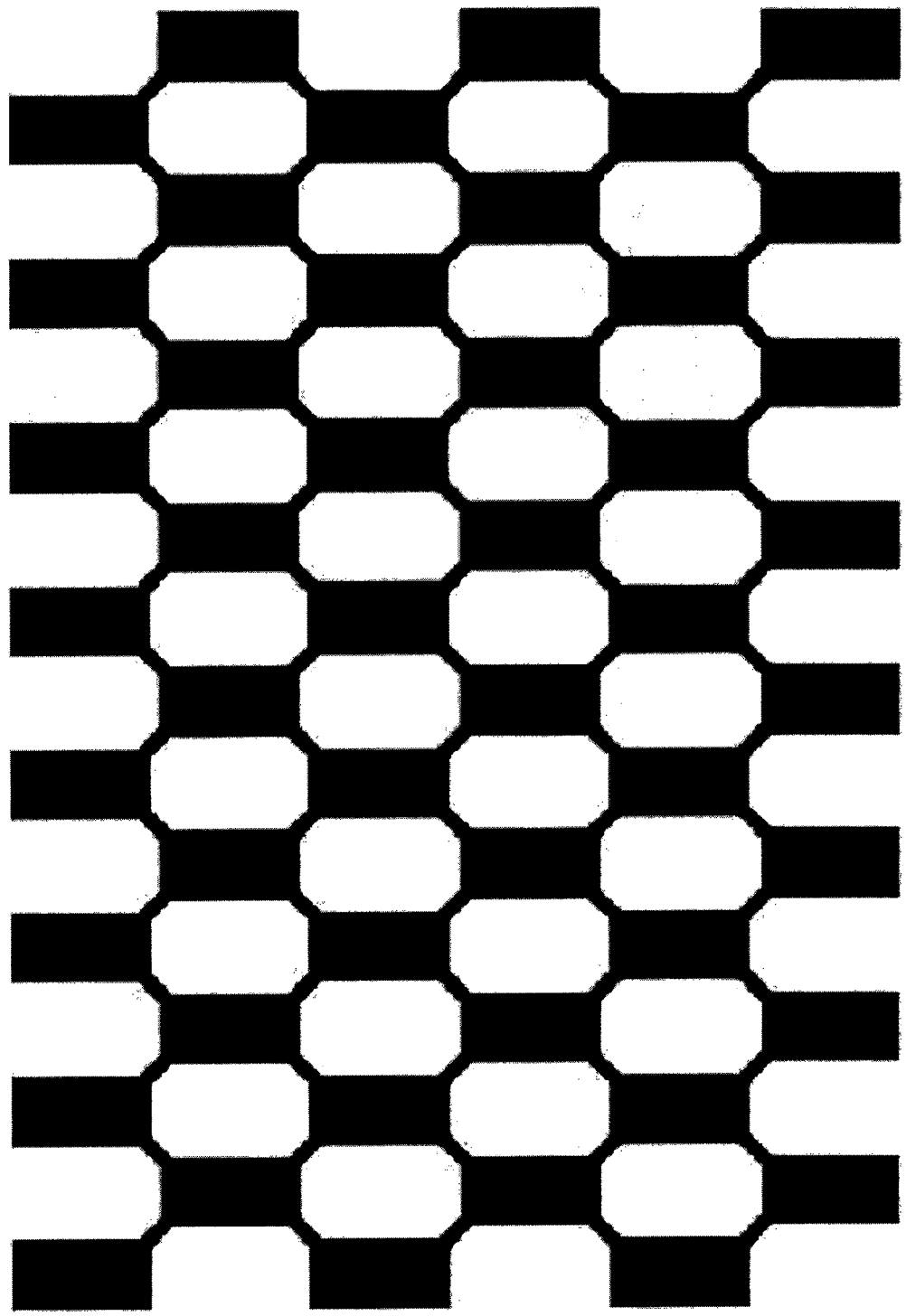
FIG. 22 is a diagram illustrating a fourth specific example of the parallax barrier according to the first embodiment of the invention.

A parallax barrier according to a fourth specific example of the first embodiment of the invention is shown in FIG. 22. The image display panel shown in FIG. 10 is used as an image display panel.

All the parallax barrier pieces of the parallax barrier are interconnected to each other.

Figure 23:
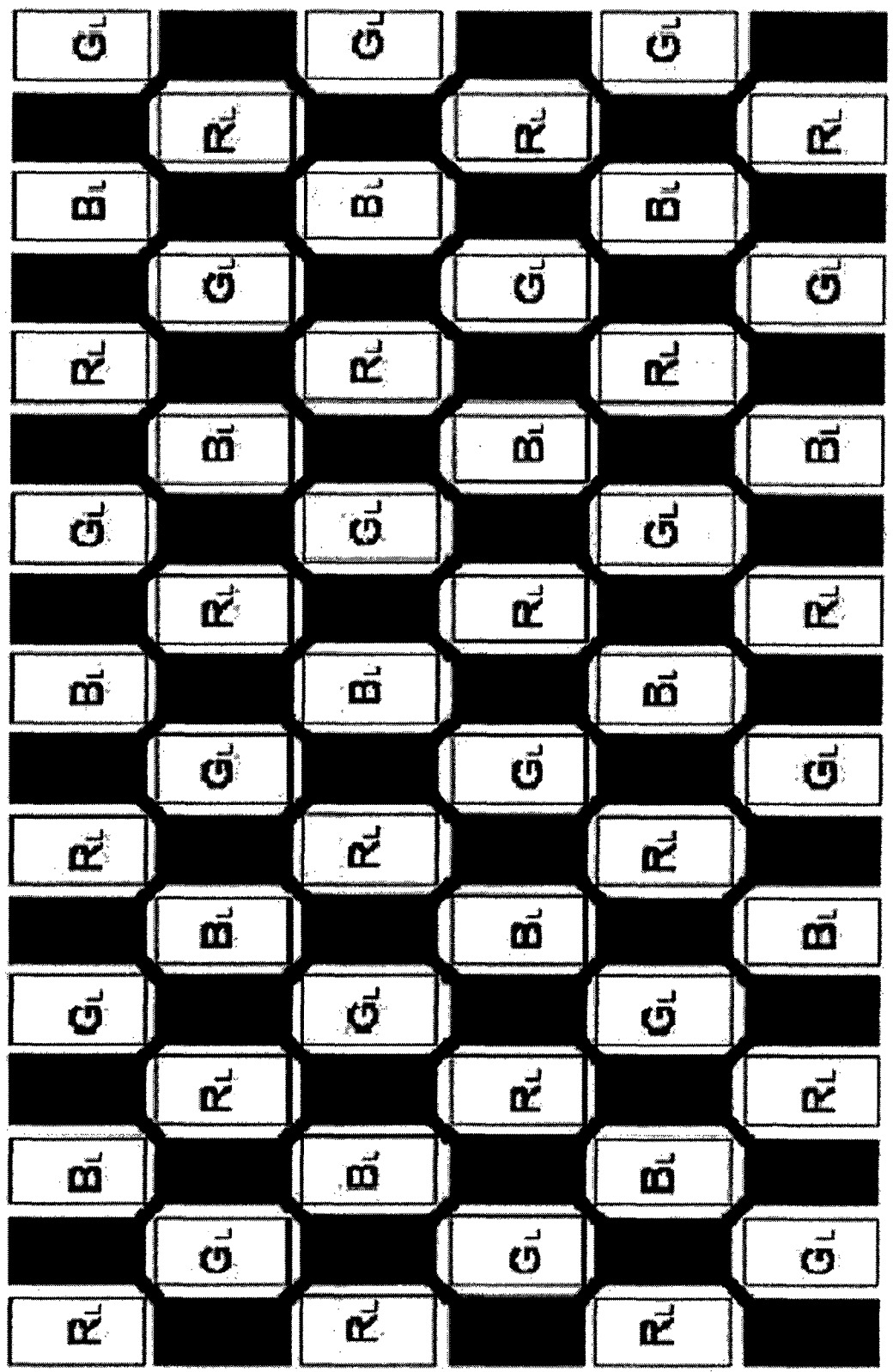
FIG. 23 is a diagram illustrating a left-eye image formed by the parallax barrier shown in FIG. 22 and the image display panel shown in FIG. 10.
Figure 24:
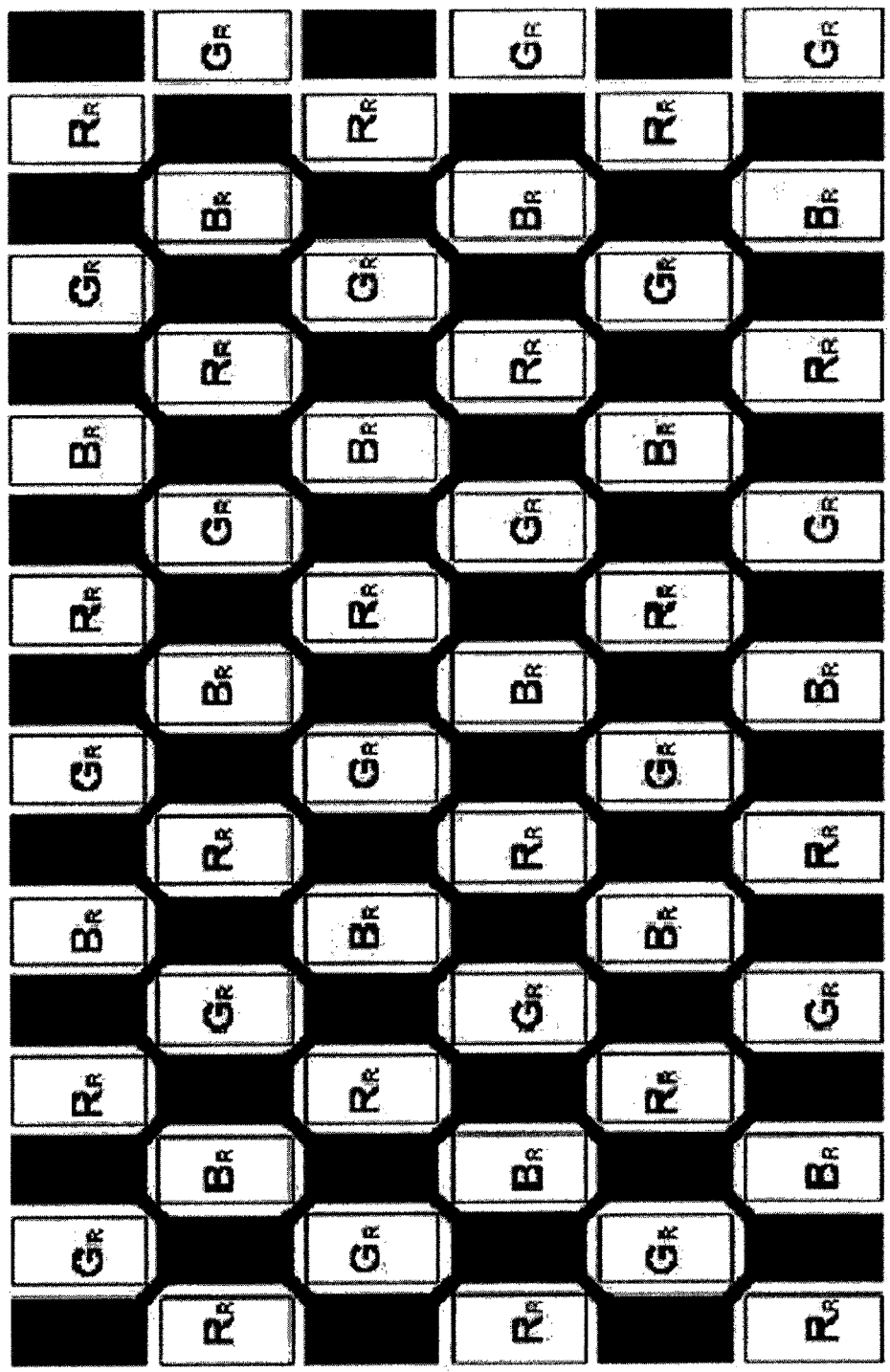
FIG. 24 is a diagram illustrating a right-eye image formed by the parallax barrier shown in FIG. 22 and the image display panel shown in FIG. 10.

FIGS. 23 and 24 are diagrams illustrating the left-eye image and the right-eye image formed by the parallax barrier shown in FIG. 22 and the image display panel shown in FIG. 10.

According to the fourth specific example, the linear barrier shape is removed, thereby obtaining a natural stereoscopic image.

Second Embodiment

In a second embodiment of the invention, the left-eye image and the right-eye image are separated using the RGB pixels as a unit pixel.

As shown in FIGS. 25 and 26, the stereoscopic image display apparatus according to the second embodiment of the invention includes an image display panel and a parallax barrier having parallax barrier pieces disposed in the front of the image display panel. Here, the image display panel has a pixel pattern in which left-eye pixels and right-eye pixels are alternately arranged in horizontal and vertical directions and the left-eye pixels and the right-eye pixels have a plurality of left-eye sub pixels and a plurality of right-eye sub pixels, respectively. The parallax barrier is spaced apart from the image display panel by a predetermined distance and the parallax barrier pieces with a predetermined size are arranged at a predetermined interval in the horizontal and vertical directions so as to allow a left eye and a right eye to separately recognize a left-eye image and a right-eye image formed by the left-eye pixels and the right-eye pixels, respectively.

In the second embodiment of the invention, unlike the first embodiment, the unit pixels are divided into the left-eye pixels and the right-eye pixels to obtain a stereoscopic image, without separating the left-eye image and the right image at the level of RGB pixels, that is, sub pixels. Accordingly, there may be a problem with an occurrence of a color mixing phenomenon. However, in the second embodiment of the invention, since the parallax barrier includes the parallax barrier pieces and the parallax barrier pieces have a dot shape, the dots of the parallax barrier pieces are displayed as if they were dispersed all over the entire screen, thereby obtaining a predetermined advantage. As a result, according to the second embodiment of the invention, the linear barrier shape is removed, thereby obtaining a natural stereoscopic image.

Third Embodiment

In a third embodiment of the invention, the first embodiment in which the left-eye image and the right-eye image are separated at the level of sub pixels and the second embodiment in which the left-eye image and the right-eye image are separated using the sub pixels as a unit pixel are combined.

A stereoscopic image display apparatus according to the third embodiment of the invention includes an image display panel and a parallax barrier which has parallax barrier pieces in the front of the image display panel. Here, the image display panel has a pixel pattern in which left-eye sub pixels and right-eye sub pixels are alternately arranged at an interval of a predetermined first number of pixels in a horizontal direction. The parallax barrier is spaced apart from the image display panel by a predetermined distance and the parallax barrier pieces with a predetermined size are arranged at predetermined first and second intervals corresponding to the first and second numbers of pixels in the horizontal and vertical directions, respectively, so as to allow a left eye and a right eye to separately recognize a left-eye image and a right-eye image formed by the left-eye sub pixels and the right-eye sub pixels, respectively.

The parallax barrier and the image display panel when the first number of pixels and the second number of pixels are 1 and 2, respectively, are shown in FIGS. 29 and 30.

The first number of pixels and the second number of pixels may be 2 and 1, respectively. It will be easily understood by those skilled in the art that the numbers of pixels can be selected arbitrarily as long as it does not damage the quality of a stereoscopic image.

In the third embodiment of the invention, unlike the first embodiment, the unit pixels are divided into the left-eye pixels and the right-eye pixels to obtain a stereoscopic image, without separating the left-eye image and the right image at the level of RGB pixels, that is, sub pixels. Accordingly, there may be a problem with an occurrence of a color mixing phenomenon. However, in the third embodiment of the invention, since the parallax barrier includes the parallax barrier pieces and the parallax barrier pieces have a dot shape, the dots of the parallax barrier pieces are displayed as if they were dispersed all over the entire screen, thereby obtaining a predetermined advantage. As a result, according to the third embodiment of the invention, the linear barrier shape is removed, thereby obtaining a natural stereoscopic image.

Hitherto, the embodiments and the specific examples of the invention have been described.

When the technical spirit of a previous application, PCT/KR03/01537, of the inventor is combined into the embodiments and the specific examples in which the left-eye image and the right-eye image are separated at the level of sub pixels, more excellent effects can be obtained. It should be noted that any embodiment including combinations of the techniques belongs to the scope of the invention and the previous invention. When the technical spirit of a previous application, PCT/KR03/01415, of the inventor is combined into the embodiments in which the left-eye image and the right-eye image are separated at the level of unit pixel or at the intermediate level between the sub pixels and the unit pixels, more excellent effects can be obtained. It should be noted that any embodiment including combinations of the techniques belongs to the scope of the invention and the previous invention.

The stereoscopic image display apparatus according to the invention may employ an image display panel in which the pixels or sub pixels form unit pixels with any one pattern of a strip pattern, a mosaic pattern, and a delta pattern.

In the stereoscopic image display apparatus according to the invention, the parallax barrier may be one liquid crystal display panel of TN (twisted nematic), STN (super-twisted nematic), FSTN (film compensated super twisted nematic), HTN (Hybrid Twisted Nematic), CSTN (Color Super Twisted Nematic) liquid crystal panels or may be a film type with a predetermined pattern. Since such liquid crystal display panels can be easily put into practice by those skilled in the art, detailed description thereof will be omitted.

The stereoscopic image display apparatus according to the invention means a 2D/3D convertible stereoscopic image display apparatus as described above.

INDUSTRIAL APPLICABILITY

According to the invention, since a strip pattern is removed from the stereoscopic image, it is possible to obtain a natural stereoscopic image.

According to the invention, since a strip pattern is removed from the stereoscopic image and a color mixing phenomenon is removed, it is possible to obtain a natural and clear stereoscopic image.

The exemplary embodiments have been described in the drawings and the specification. While particular terms have been used in the exemplary embodiments, they are used for only explaining the invention, but not for limiting the scope of the invention described in the claims. Therefore, it can be understood by those skilled in the art that the invention can be variously modified and altered without departing from the spirit and scope of the invention described in the attached claims.

The invention claimed is:

1. A stereoscopic image display apparatus comprising:
   an image display panel; and
   a parallax barrier arranged apart from the image display panel by a predetermined distance,
   wherein the image display panel has a pixel pattern in which left-eye sub pixels and right-eye sub pixels are alternately arranged in horizontal and vertical directions, and
   wherein the parallax barrier comprises a plurality of parallax barrier pieces arranged in sizes and patterns that correspond to the sub pixels such that light is intercepted or transmitted so as to allow a left eye and a right eye to separately recognize a left-eye image and a right-eye image formed by the left-eye sub pixels and the right-eye sub pixels, respectively.

2. A stereoscopic image display apparatus comprising:
   an image display panel; and
   a parallax barrier arranged apart from the image display panel by a predetermined distance,
   wherein the image display panel has a pixel pattern in which left-eye pixels and right-eye pixels are alternately arranged in horizontal and vertical directions,
   wherein each of the left-eye pixels and the right-eye pixels have a plurality of left-eye sub pixels and a plurality of right-eye sub pixels, respectively, and
   wherein the parallax barrier comprises a plurality of parallax barrier pieces arranged in sizes and patterns that correspond to the pixels such that light is intercepted or transmitted so as to allow a left eye and a right eye to separately recognize a left-eye image and a right-eye image formed by the left-eye sub pixels and the right-eye sub pixels, respectively.

3. The stereoscopic image display apparatus according to claim 1 or 2, wherein the parallax barrier has a repeated pattern in which a first parallax barrier piece in a first vertical line of the parallax barrier is interconnected to a second parallax barrier piece which is a piece in a second vertical line adjacent to the right side of the first vertical line and which is adjacent to the right-lower side of the first parallax barrier piece, and the second parallax barrier piece is interconnected to a third parallax barrier piece which is a piece in a third vertical line adjacent to the right side of the second vertical line and which is adjacent to the right-lower side of the second parallax barrier piece.

4. The stereoscopic image display apparatus according to claim 1 or 2, wherein the parallax barrier has a repeated pattern in which a first parallax barrier piece in a first horizontal line of the parallax barrier is interconnected to a second parallax barrier piece which is a piece in a second horizontal line adjacent to the lower side of the first horizontal line and which is adjacent to the right-lower side of the first parallax barrier piece, and the second parallax barrier piece is interconnected to a third parallax barrier piece which is a piece in the first horizontal line and which is adjacent to the right-upper side of the second parallax barrier piece.

5. The stereoscopic image display apparatus according to claim 1 or 2, wherein the parallax barrier has a repeated pattern in which the parallax barrier pieces are interconnected in a predetermined combination.

6. The stereoscopic image display apparatus according to claim 1 or 2, wherein all the parallax barrier pieces of the parallax barrier are interconnected.

7. The stereoscopic image display apparatus according to any one of claim 1 or 2, wherein the parallax barrier is one liquid crystal display panel of TN, STN, FSTN, HTN, and CSTN liquid crystal panels or is of a film type.

8. The stereoscopic image display apparatus according to claim 1 or 2, wherein the parallax barrier has a repeated pattern in which a first parallax barrier piece in a first vertical line of the parallax barrier is interconnected to a second parallax barrier piece which is a piece in a second vertical line adjacent to the right side of the first vertical line and which is adjacent to the right-lower side of the first parallax barrier piece, and the second parallax barrier piece is interconnected to a third parallax barrier piece which is a piece in the first vertical line and which is adjacent to the left-lower side of the second parallax barrier piece.

9. A stereoscopic image display apparatus comprising
an image display panel; and
a parallax barrier arranged apart from the image display panel by a predetermined distance,
wherein the image display panel has a pixel pattern in which left-eye sub pixels and right-eye sub pixels are alternately arranged, horizontally at an interval of every other sub pixel, and vertically in first and second intervals corresponding to first and second number of sub pixels,
wherein the first and the second number of sub pixels are 1 and 2, 1 and 3, 2 and 1, or 3 and 1, and
wherein the parallax barrier comprises a plurality of parallax barrier pieces of size equal to the sub pixel size arranged corresponding to the sub pixel arrangement pattern in the image display panel, such that light is intercepted or transmitted so as to allow a left eye and a right eye to separately recognize a left-eye image and a right-eye image formed by the left-eye sub pixels and the right-eye sub pixels, respectively.

10. The stereoscopic image display apparatus according to claim 9, wherein the parallax barrier has a repeated pattern in which the parallax barrier pieces are interconnected in a predetermined combination.

11. The stereoscopic image display apparatus according to claim 9, wherein all the parallax barrier pieces of the parallax barrier are interconnected.

12. The stereoscopic image display apparatus according to claim 9, wherein the pixels or the sub pixels of the image display panel form unit pixels with any one pattern of a strip pattern, a mosaic pattern, and a delta pattern.

13. The stereoscopic image display apparatus according to claim 9, wherein the parallax barrier is one liquid crystal display panel of TN, STN, FSTN, HTN, and CSTN liquid crystal panels or is of a film type.

* * * * *